United States Patent [19]

Koseko et al.

[11] Patent Number: 5,603,871
[45] Date of Patent: Feb. 18, 1997

[54] METHOD FOR MANUFACTURING MOLDED RESIN PRODUCT AND PLASTIC MIRROR

[75] Inventors: Hisaaki Koseko, Atsugi; Wataru Ohtani, Sagamihara; Hidenori Ito; Toshihiro Kanematsu, both of Atsugi; Akio Hirano, Yokohama; Shinya Senoo, Atsugi; Jun Watanabe, Yokohama; Kiyotaka Sawada, Atsugi, all of Japan

[73] Assignee: Ricoh Company, Ltd., Tokyo, Japan

[21] Appl. No.: 533,714

[22] Filed: Sep. 26, 1995

Related U.S. Application Data

[63] Continuation of Ser. No. 138,966, Oct. 21, 1993, abandoned.

[30] Foreign Application Priority Data

| Oct. 23, 1992 | [JP] | Japan | 4-285837 |
| Dec. 8, 1992 | [JP] | Japan | 4-327104 |
| Dec. 11, 1992 | [JP] | Japan | 4-331427 |
| Dec. 24, 1992 | [JP] | Japan | 4-343784 |
| Jan. 8, 1993 | [JP] | Japan | 5-001537 |

[51] Int. Cl.⁶ ................................... B29D 11/00
[52] U.S. Cl. ................ 264/1.9; 264/2.7; 264/163; 264/102; 264/325; 264/328.1; 425/407; 425/808
[58] Field of Search ................ 264/1.9, 2.7, 129, 264/132, 134, 319, 320, 325, 327, 163, 328.14, 328.16, 101, 102, DIG. 78, 328.1; 425/406, 407, 808, 810

[56] References Cited

U.S. PATENT DOCUMENTS

| 3,596,317 | 8/1971 | Nicholson | 425/407 |
| 3,839,129 | 10/1974 | Neumann | 264/1.9 |
| 3,932,097 | 1/1976 | Press | 425/407 |
| 4,018,552 | 4/1977 | Prast et al. | 425/407 |
| 4,386,123 | 5/1983 | Coburn, Jr. | 264/1.9 |
| 4,406,045 | 9/1983 | Schwab | 264/1.9 |
| 4,563,145 | 1/1986 | de Meij | 425/407 |
| 4,752,204 | 6/1988 | Kataoka | 425/407 |
| 4,757,972 | 7/1988 | Brown | 425/407 |
| 5,064,597 | 11/1991 | Kim | 425/407 |

FOREIGN PATENT DOCUMENTS

| 1359151 | 12/1987 | U.S.S.R. | 264/2.7 |

*Primary Examiner*—Mathieu D. Vargot
*Attorney, Agent, or Firm*—Oblon, Spivak, McClelland, Maier & Neustadt, P.C.

[57] ABSTRACT

In an aging device used to manufacture a plastic molded product, injecting and aging processes are separated from each other. Namely, a plastic base material is approximately processed in advance in a final shape by injection molding. Thereafter, the plastic base material is inserted into an aging die having plural cavities and attached to a press machine such that the aging die is clamped and opened. Next, the plastic base material is heated and melted until a temperature equal to or higher than a glass transition point so as to generate an internal resin pressure. Next, the plastic base material is gradually cooled to transfer a mirror face thereto. The aging device has a die cooling device having plural heat pipes for cooling the die and has a die heating device having plural heaters for heating the die. The heat pipes and the heaters are arranged in a die plate of the press machine. In this aging device, the aging die can be uniformly and rapidly heated and cooled and a cooling speed of the aging die can be easily controlled.

6 Claims, 29 Drawing Sheets

117

111

5,603,871

METHOD FOR MANUFACTURING MOLDED RESIN PRODUCT AND PLASTIC MIRROR

This application is a continuation of application Ser. No. 08/138,966, filed on Oct. 21, 1993, now abandoned.

BACKGROUND OF THE INVENTION

1. Field of the Invention

The present invention relates to an aging device usable in a method for manufacturing a plastic molded product part. More particularly, the present invention relates to an aging device in which a die for aging can be uniformly and rapidly heated and cooled and a cooling speed of the die for aging can be easily controlled and the die for aging can be easily manufactured at low cost.

The present invention also relates to a method for manufacturing a plastic molded product and used in an optical scanning system such as a laser beam printer, a facsimile telegraph, etc. and a video camera, etc. More particularly, the present invention relates to a method for suitably manufacturing a plastic molded product such as a large-sized long plastic lens, etc.

The present invention further relates to a method and an apparatus for manufacturing a plastic mirror requiring a mirror face with high accuracy.

2. Description of the Related Art

In a general known method for manufacturing a plastic molded product, a plastic base material is approximately processed in a final shape by injection molding in advance. Thereafter, this plastic base material is inserted into a die having a plurality of cavities. Next, this plastic base material is heated and melted until a temperature equal to or higher than a transition point of glass so that an internal pressure of resin is caused. Next, the plastic base material is gradually cooled to transfer a mirror face. In this manufacturing method, injecting and aging processes of the plastic molded product are separated from each other as mentioned above.

In this manufacturing method of the plastic molded product, it is important to rapidly heat and cool the plastic base material in the aging process and uniformly control a temperature within the die.

An aging device having the above aging process has a heating section for heating the plastic base material and a cooling section for cooling the plastic base material. In the heating section, a plurality of heaters are buried into the die for aging. In the cooling section, a plurality of heat pipes are buried into the die for aging. The plastic base material is heated by the plural heaters buried in the heating section. The plastic base material is cooled by the plural heat pipes buried in the cooling section. In particular, in the case of cooling, a refrigerant such as water, oil, etc. flows through an exposure portion from the die of the heat pipes. A flow rate of this refrigerant is adjusted to suitably control a cooling speed of the die. A fin is attached to the exposure portion. The cooling speed is also suitably controlled by adjusting an amount of air sent to the fin.

However, in the above general aging device, the die for aging is cooled in the cooling section in which the plural heat pipes are buried into the die for aging. Accordingly, the flow rate of the refrigerant is excessively large so that no flow speed of the refrigerant can be increased. Therefore, no heat exchange of the refrigerant can be sufficiently performed so that it is impossible to rapidly cool the die for aging and precisely control the cooling speed of the die for aging. Further, the refrigerant temperature is changed in the vicinity of inflow and outflow ports of the refrigerant. Therefore, heat exchange efficiencies of heat pipes near the inflow and outflow ports are changed so that no die can be uniformly cooled in a certain case.

Further, when a heat pipe is arranged in the die, the heat pipe tends to be damaged. Therefore, no heat pipe can be press-fitted into the die so that a clearance is caused between the die and the heat pipe. Accordingly, there is a case in which cooling efficiency of the heat pipe is reduced by heat loss caused by this clearance.

When a heating speed of the die is increased by heating a heater, heating overshoot tends to be caused so that the die for aging is excessively heated or it takes much time to heat the die for aging in a certain case.

Since heaters and heat pipes are arranged within the die for aging in the general aging device, it is necessary to manufacture and arrange another die for aging having these heaters and heat pipes in accordance with a change in molded product object. Accordingly, it takes time and labor to manufacture the die and manufacturing cost of the die is increased in a certain case.

It is therefore an object (as a first object) of the present invention to provide an aging device in which a die for aging can be uniformly and rapidly heated and cooled and a cooling speed of the die for aging can be easily controlled and the die for aging can be easily manufactured at low cost.

In an injection-molding operation of a molded resin product such as a plastic lens, the plastic lens, etc. are generally obtained with high accuracy by cooling all resins from a temperature equal to or higher than a transition temperature of glass. In this case, it is difficult to obtain a molded product having no contraction, etc. with reduced residual stress unless the molded product is gradually cooled in a state of a temperature difference of several ten degrees from at least the temperature equal to or higher than the glass transition temperature to a temperature equal to or lower than a load flexing temperature. In the case of a plastic lens, it is difficult to obtain a molded lens product having small birefringence unless the molded lens product is gradually cooled in such a state.

It is necessary to cool the die so as not to cause this contraction, etc. while a temperature of the die filled with resin having a low coefficient of thermal conductivity is uniformed as much as possible. Therefore, various kinds of cooling devices are arranged in the die for molding the plastic product to cool this die.

For example, FIG. 41 shows a general cooling device. In FIG. 41, each of reference numerals 1 and 2 designates a die plate of a hydraulic press machine. Heating-cooling members 5 and 6 are respectively attached to the die plates 1 and 2 through heat insulating materials 3 and 4. A die 7 for plastic molding is attached to the heating-cooling members 5 and 6. This die 7 is constructed by a pair of divisional dies 8 and 9 opposed to each other. The divisional dies 8 and 9 form at least one cavity and have at least one mirror face.

A plurality of heaters 10 and 11 are respectively buried into the heating-cooling members 5 and 6. The heaters 10 and 11 are connected to an unillustrated heating source. The die 7 is heated by heating the heaters 10 and 11 by this heating source. An unillustrated cooling passage is formed in each of the heating-cooling members 5 and 6. A refrigerant such as water, oil, etc. is supplied from a refrigerant temperature regulator 13 to an end portion of this cooling passage through a plurality of pipe lines 12.

A thermoplastic base material is preprocessed in a final shape in advance and is inserted into the cavity of the above die 7. Thereafter, the die 7 is heated to a temperature equal to or higher than a glass transition temperature of the plastic base material by heating the heaters 10 and 11. Thus, the plastic base material is melted and a predetermined resin pressure is generated within the cavity so that a mirror face is transferred to the plastic base material. Next, the die 7 is gradually cooled by supplying the refrigerant to the cooling passage through the pipe lines 12. When the temperature of the die 7 is reduced to a temperature equal to or lower than a thermal deforming temperature of resin, the plastic base material is taken out of the cavity so that the plastic base material is molded as a plastic molded product.

For example, Japanese Patent Application Laying Open (KOKAI) No. 61-279515 shows a general example about another cooling structure. In this cooling structure, a plurality of heat pipes are buried into a die and a heating member is attached to each of the heat pipes. Further, a cooling passage is disposed within the die such that the cooling passage extends over the plural heat pipes. A cooling portion able to exchange heat of a refrigerant such as cooling water, etc. is disposed in a portion of the heat pipes. The cooling portion and the cooling passage of the die are set to be in conformity with each other so that the cooling refrigerant is supplied to the cooling passage through the pipe lines. The heat pipes are cooled by this cooling refrigerant so that the die is cooled through the heat pipes.

However, the plural pipe lines 12 are connected to the cooling passages of the heating-cooling members 5 and 6 in the former die 7 for plastic molding. Accordingly, there is a problem that operability of the die 7 is very reduced when the die 7 is opened and closed. Further, no material of the die 7 is especially considered so that no die 7 can be cooled uniformly and rapidly, thereby reducing cooling efficiency of the die 7.

In the latter die for injection molding, a plurality of pipe lines are also connected to the cooling passage of the die. Accordingly, operability of the die is very reduced when the die is opened and closed. Further, it is necessary to mold the cooling passage in addition to holes for burying the heat pipes so that manufacturing cost of the die is increased. Further, no material of the die is especially considered and the cooling passage is arranged such that the cooling passage extends over the plural heat pipes. Therefore, no die can be cooled uniformly and rapidly and it is difficult to control and adjust a temperature of the die so that cooling efficiency of the die is reduced.

The pipe lines are arranged in the above two dies for plastic molding and injection molding. Accordingly, diameters of these pipes are reduced by rust, dirt, etc. so that cooling efficiency of each of the dies is reduced. Therefore, it is necessary to clean the pipe lines so that a maintenance operation of the pipe lines is additionally required.

Another object (as a second object) of the present invention is to provide a device for cooling a die for plastic molding in which a cooling speed of the die can be easily controlled while the die is cooled uniformly and rapidly, and cooling efficiency of the die can be improved and pipe lines for cooling are removed from the die so that operability of the die can be improved when the die is opened and closed.

For example, Japanese Patent Application Laying Open (KOKAI) No. 4-163119 shows a general method for manufacturing a plastic molded product. This manufacturing method has an injection molding process and an aging process. In the injection molding process, predetermined resin is heated to a temperature equal to or higher than a fluidizable temperature at which this resin can be fluidized. The resin is then injection-molded into a die held at a temperature equal to or lower than a thermal deforming temperature of this resin. A gate seal is next formed. In the aging process, the die filled with the above resin is heated such that the temperature of the above injection-molded resin is equal to or higher than a glass transition temperature of this resin. The die is then held for a predetermined time at the temperature equal to or higher than the glass transition temperature. The die is next gradually cooled until the temperature of the above resin is equal to or lower than the thermal deforming temperature of the resin. Since the manufacturing method has the above injection molding process and the above aging process, the die temperature can be set to be equal to or lower than the thermal deforming temperature of the resin.

For example, a general die for aging is shown in Japanese Patent Application No. 3-33130. In this patent application, the die for aging is constructed and manufactured by a material having a preferable coefficient of thermal conductivity. Accordingly, heating and cooling times of the die can be reduced so that throughput can be improved. Further, yield can be improved by approximately cooling the die uniformly at a cooling time thereof.

For example, Japanese Patent Application No. 4-29119 shows a general plastic molding machine. In this patent application, at least one of dies for aging is set to a separating die able to be separated into a plurality of die members around a cavity as a center. This separating die can be clamped by a die clamping mechanism from both sides of the separating die. Accordingly, a plastic base material can be easily inserted and molded into the cavity and can be easily taken out of the cavity as a molded product. Accordingly, the plastic base material can be molded in a desirable shape without distorting and damaging the molded product.

In a general method for taking the molded product out of the die in the plastic molding machine, the molded product is projected outward by using an ejector pin, an ejector sleeve, etc. Otherwise, the molded product is separated from the die by using a stripper plate. When a plurality of molded products are taken out of the die, the plural molded products projected out by the above taking-out method are connected to each other through a runner and a sprue. Accordingly, the molded products can be easily and simultaneously taken out of the die.

In a method for manufacturing a plastic molded product such as a lens, a mirror, etc. with high accuracy, a plastic base material is approximately processed in a final shape by injection molding in advance. Thereafter, the plastic base material is inserted into a die having a plurality of cavities. The plastic base material is next heated and melted until a temperature equal to or higher than a glass transition point so that an internal pressure of resin is generated. Next, the plastic base material is gradually cooled and a mirror face is transferred. In this manufacturing method, injecting and aging processes are separated from each other as mentioned above.

However, in an aging device of this general molding machine, no gate is formed in molded products inserted and taken out of the aging die. The molded products are individually separated from each other. Accordingly, no plural molded products can be simultaneously inserted and taken out of the aging die. Further, it takes much time to insert and take each of the plural molded products out of the aging die one by one. Accordingly, a cyclic time of the aging process is increased so that merits of the aging process are reduced even when many molded products are taken out of the aging die.

Another object (as a third object) of the present invention is to provide an aging device for reducing the cyclic time of an aging process.

As mentioned above, the manufacturing method of a plastic molded product shown in the above Japanese Patent Application Laying Open (KOKAI) No. 4-163119 divisionally has an injection molding process and an aging process. In the injection molding process, a resin base material is injected into a die for injection molding and is approximately preprocessed in a final shape. In the aging process, the preprocessed resin base material is inserted and heated within a cavity of the die for aging. Thereafter, the resin base material is gradually cooled.

Since this manufacturing method has the divided injection-molding and aging processes, the injection-molding and aging processes can be designed such that these processes are suitable for molding processing. Further, the number of taking-out operations of the die in the aging process can be set to be larger than that in the injection molding process. Accordingly, it is possible to perform many aging operations by using one aging die.

However, in this manufacturing method of a plastic molded product divisionally having the injection-molding and aging processes, the molded product constructed by only a resin material is simply manufactured. Accordingly, in this manufacturing method, no hybrid molded product as a molded product formed by combining this resin material with a different material is manufactured with high accuracy. Therefore, it is desirable to provide a method for manufacturing a molded product usefully using each of material characteristics.

Another object (as a fourth object) of the present invention is to provide a method for manufacturing a molded product in which an integral molded product can be manufactured with high accuracy by melting and joining resin with a material of a different kind, and a molded product usefully using different material characteristics can be obtained by suitably selecting used materials and a degree of freedom in design of the molded product can be increased. In this manufacturing method, a material of at least one kind different from resin is combined with resin in an aging process and is injected into an aging die set such that a resin temperature is equal to or higher than a glass transition temperature. Thereafter, the combined resin material is held for a predetermined time at a temperature equal to or higher than the glass transition temperature and is gradually cooled to a temperature equal to or lower than a thermal deforming temperature of the resin.

Another object (as a fifth object) of the present invention is to provide a method for manufacturing a molded product in which a material of at least one kind among aged materials is made of thermoplastic resin so that the plural materials can be easily integrated with each other in a melting state of resin and a mirror face can be easily transferred to resin.

Another object (as a sixth object) of the present invention is to provide a method for manufacturing a molded product in which an aging temperature of an aging die is set to be equal to or higher than a lowest glass transition temperature of combined resin materials so that the resin materials can be rapidly melted and integrated with each other and an aging time can be reduced.

Another object (as a seventh object) of the present invention is to provide a method for manufacturing a molded product having a high quality in which a taking-out temperature of an aging die for aging is set to be equal to or lower than a lowest glass transition temperature of combined resin materials so that different materials are cooled and reliably integrated with each other and can be then taken out of the aging die.

Another object (as an eighth object) of the present invention is to provide a method for manufacturing a molded product having a high quality in which a cavity of an aging die is set to be in a vacuum state at an aging time so as to prevent air bubbles from being mixed and flowed to a central portion of joining faces of materials in an aging process so that it is possible to prevent air bubbles from being mixed and flowed into a central portion of the molded product formed by integrating these materials with each other.

As mentioned above, the general manufacturing method of a plastic molded product in Japanese Patent Application Laying Open (KOKAI) No. 4-163119 divisionally has an injection molding process and an aging process. In the injection molding process, resin is heated to a temperature equal to or higher than a fluidizable temperature of resin at which this resin can be fluidized. The resin is then injected into a die held at a temperature equal to or lower than a thermal deforming temperature of this resin so that the resin is approximately preprocessed in a final shape. In the aging process, the preprocessed resin material is flowed into a cavity of the aging die and is held for a predetermined time at a temperature equal to or higher than a glass transition temperature of the resin. Thereafter, the resin material is gradually cooled to a temperature equal to or lower than a thermal deforming temperature of the resin.

Since this manufacturing method has the divided injection-molding and aging processes, the injection-molding and aging processes can be designed such that these processes are suitable for molding processing. Further, the number of taking-out operations of the die in the aging process can be set to be larger than that in the injection molding process. Accordingly, it is possible to perform many aging operations by using one aging die as mentioned above.

However, in this method for manufacturing a plastic molded product by dividing into the injection molding process and the aging process, it is necessary to dispose a large-sized injection molding machine to obtain a molded product which is large-sized and long.

Namely, a large force for clamping the die is required in the injection molding process since a large pressure of melted resin is caused when the melted resin is injected into the die to fill the die with the melted resin. Therefore, a large-sized injection molding machine for applying the large clamping force to the die is required to form a molded product which is large-sized and long. In contrast to this, the clamping force of the die may be set to be small in the aging process since only an internal pressure is generated by thermal expansion of resin caused by an increase in temperature of the aging die. Accordingly, the large-sized molding machine is required to manufacture a large-sized long molded product although no large-sized aging die is required. Therefore, manufacturing cost of the molded product is very increased.

Further, cavities of the injection molding die and the aging die have the same shape to form the same molded product. Accordingly, a molded product having a shape of only one kind can be manufactured. Therefore, it is impossible to sufficiently cope with mass production of many kinds increased in the future by the same die.

Another object (as a ninth object) of the present invention is to provide a method for manufacturing a plastic molded product at low cost in which a resin base material approximately preprocessed in a final shape by injection molding is divided into two divisional portions or more so as to mold the resin base material twice or more so that clamping force of a die can be reduced at each of injection molding times, and a large-sized long molded product can be easily manufactured by a compact molding machine.

Another object (as a tenth object) of the present invention is to provide a method for manufacturing a plastic molded product in which no divisional direction of a resin base material approximately preprocessed in a final shape is set to be parallel with a parting face of an aging die so that clamping force of the die can be further reduced at an injection molding time.

Another object (as an eleventh object) of the present invention is to provide a method for manufacturing a plastic molded product in which resin base materials are joined with each other and are easily formed in a shape for providing different thicknesses of the resin base materials, and it is possible to prevent contraction of the molded product from being caused in the formation of the resin base materials.

Another object (as a twelfth object) of the present invention is to provide a method for manufacturing a plastic molded product in predetermined shapes of many kinds.

Another object (as a thirteenth object) of the present invention is to provide a method for manufacturing a plastic molded product having a high quality in which it is possible to prevent air bubbles from being mixed and flowed to a central portion of joining faces of resin base materials in an aging process so that it is possible to prevent air bubbles from mixed and flowed into a central portion of the molded product formed by integrating the resin base materials with each other.

Another object (as a fourteenth object) of the present invention is to provide a method for manufacturing a plastic molded product having a high quality in which it is possible to prevent air bubbles from being mixed and flowed to a central portion of joining faces of resin base materials in an aging process by setting a cavity of an aging die to be in a vacuum state in the aging process so that it is possible to prevent air bubbles from being mixed and flowed into a central portion of the molded product formed by integrating the resin base materials with each other.

In general, many kinds of a polygon mirror, an fθ mirror, etc. are used to perform an optical scanning operation of a laser printer, a copying machine, etc. However, manufacturing amounts of the polygon mirror, the fθ mirror, etc. are small. Therefore, the polygon mirror, the fθ mirror, etc. are constructed by plastic materials in many cases. However, a mirror face having a high accuracy has been recently required for the polygon mirror, the fθ mirror, etc. in accordance with high processing speed and high density of information.

In a method for manufacturing a plastic mirror of this kind, a mirror face of a die having a high accuracy is transferred by injection molding, injection-compression molding, etc. Thereafter, a predetermined metal is directly evaporated to a transferred mirror face portion of a molded product so that a metallic reflecting film is formed as a mirror face. The mirror face portion of the molded product is covered with $MgF_2$, etc. as a ground to evaporate the metallic reflecting film so as to improve adhesion of the metallic reflecting film and the molded product. Further, a protecting film of $SiO_2$, etc. is formed on a surface of the metallic reflecting film to improve a strength thereof. For example, such a plastic mirror manufacturing method is described in Japanese Patent Publication (KOKOKU) No. 61-25131 and Japanese Utility Model Application Laying Open (KOKAI) No. 59-116905.

Another plastic mirror manufacturing method is practically used. In this manufacturing method, a metallic reflecting film is formed on a plastic film. A portion of the plastic film on a side of the metallic reflecting film is adsorbed onto a mirror face of a die by suction, etc. Thereafter, resin is injection-molded on a rear side of the metallic reflecting film on the plastic film so that a mirror face is laminated. For example, such a plastic mirror manufacturing method is described in Japanese Patent Publication (KOKOKU) No. 4-9647 and Japanese Patent Application Laying Open (KOKAI) No. 62-224533.

However, in the plastic mirror manufacturing method using evaporation, a predetermined metal is directly evaporated to a mirror face portion by batch processing so that a mirror face is formed. Accordingly, cost of the plastic mirror is increased. Further, evaporation conditions must be changed every molded product since shapes of the plastic mirror are different from each other in accordance with uses. However, it is complicated to change in the evaporation conditions every molded product. Further, when the mirror face portion has irregularities, no metallic reflecting film can be uniformly formed.

In the manufacturing method of a plastic mirror using lamination, an apparatus for manufacturing the plastic mirror can be manufactured by only adding a slight arrangement to an existing injection molding machine with small investment. However, since melted resin is injected into a cavity adsorbing a plastic film, the plastic film is deformed with wrinkles, etc. at a high temperature and a fluidizing pressure when the melted resin is injection-molded. Accordingly, no mirror face having a high accuracy is obtained in this manufacturing method.

Accordingly, another object (as a fifteenth object) of the present invention is to provide a method and an apparatus for manufacturing a plastic mirror at low cost in which a plastic base material approximately processed in a final shape and having a mirror face portion, and a plastic film forming a metallic reflecting film thereon are inserted into a cavity and are heated and joined with each other at uniform temperature and pressure so that a mirror face of a die is transferred with high accuracy to manufacture a face of the plastic mirror having a high accuracy.

SUMMARY OF THE INVENTION

In accordance with a first structure of the present invention, the above objects can be achieved by an aging device used to manufacture a plastic molded product by separating injecting and aging processes from each other in which, after a plastic base material is approximately preprocessed in a final shape in advance by injection molding, a pair of aging divisional dies are attached to a press machine such that the aging divisional dies are opened and closed and are arranged such that the aging divisional dies are opposed to each other; the aging divisional dies have a plurality of cavities and at least one mirror face; the preprocessed plastic base material is inserted into the aging divisional dies; the plastic base material is next heated and melted until a temperature equal to or higher than a glass transition point so that an internal resin pressure is generated; and the plastic base material is gradually next cooled to transfer a mirror face thereto; the aging device comprising die cooling means having a plurality of heat pipes for cooling the divisional dies; and die heating means having a plurality of heaters for heating the divisional dies; the heat pipes and the heaters being arranged in a die plate of the press machine.

In accordance with a second structure of the present invention, at least a portion around the cavities of each of the aging divisional dies is constructed by a material having a large coefficient of thermal conductivity and the plural heat pipes are arranged in an outer circumferential end portion of this material portion or are arranged in the vicinity of this outer circumferential end portion.

In accordance with a third structure of the present invention, each of the plural heat pipes has a buried portion buried into a cooling member, and an exposure portion externally exposed from the cooling member and having a cooling source. The cooling source is constructed such that a refrigerant flows through the exposure portion. A flow rate of the refrigerant is adjusted.

In accordance with a fourth structure of the present invention, a fin is attached to the exposure portion and the cooling source is constructed by a blower. A cooling speed of the divisional dies is controlled by adjusting an amount of air supplied from the blower to the fin.

In another structure of the present invention, the cooling source is constructed by a refrigerant for dipping the exposure portion thereinto and a body movable with respect to the exposure portion and filled with the refrigerant. A cooling speed of the dies is controlled by moving the body with respect to the exposure portion and adjusting a dipping amount of the refrigerant in the exposure portion.

The present invention has a die plate replacing means for replacing the above die plate with another die plate in which the heat pipes and the heaters are not arranged.

In accordance with a seventh structure of the present invention, a material having a melting point higher than a heating temperature of the divisional dies is buried into clearances between the heaters, the heat pipes and the die plate.

The present invention also has a die temperature detecting means for detecting a temperature of the dies and has a die heating means for heating the dies to a predetermined temperature by PIP control based on the detected temperature of the dies.

The die heating means predicts a time for presetting the temperature of the dies to an object temperature. When the predicted time has passed, the die heating means heats the dies to the predetermined temperature by controlling turning-on and turning-off operations of the heaters.

The present invention has a die cooling speed control means for controlling the cooling speed of the dies by flowing the refrigerant through a flow passage in a cooling portion of the heat pipes and adjusting the flow rate of the refrigerant. The present invention also has a partition plate for adjusting the flow rate of the refrigerant and arranged within the flow passage in the cooling portion.

The partition plate can be preferably arranged in a direction perpendicular to an arranging direction of the heat pipes within the cooling portion.

In the present invention, a honeycomb construction is preferably arranged within the flow passage of the cooling portion.

In another structure of the present invention, a fin is attached to the heat pipes. The die cooling speed control means controls the cooling speed of the dies by adjusting an amount of air supplied from the blower to this fin on the basis of the temperature of the dies.

The die cooling speed control means controls the cooling speed of the dies by adjusting the temperature of cooled air supplied to the fin.

In accordance with an eighth structure of the present invention, the cavities have a telescopic structure and only nested boxes of the telescopic structure are constructed by a material having a high coefficient of thermal conductivity.

In the present invention, the heat pipes for cooling the aging dies and the heaters for heating the aging dies are arranged in the die plate of a press machine. Accordingly, the aging dies can be uniformly and rapidly heated and cooled without arranging the heat pipes and the heaters in the aging dies. Therefore, it is not necessary to arrange heat pipes and heaters in a newly replaced die every die replacement so that time, labor and cost for manufacturing the dies can be reduced.

In the present invention, the die plate replacing means replaces the die plate with a normal die plate in which heat pipes and heaters are not arranged. Accordingly, it is possible to suitably replace the die plate of the press machine having the heat pipes and the heaters with a die plate in which the heat pipes and the heaters are not arranged. Therefore, when it is necessary to dispose heat pipes and heaters in the aging dies in the case of a certain molded object, it is possible to use a die having heat pipes and heaters as each of the aging dies so that the aging dies can be used for general purposes.

In the present invention, a metallic material, etc. are buried into clearances between the heaters, the heat pipes and the dies or the die plate. This metallic material preferably has a melting point higher than a heating temperature of the dies in consideration of heat resistance. In this case, a metal having a melting point higher than the heating temperature of the dies can be buried into the clearances between the heaters, the heat pipes and the dies or the die plate. Therefore, the clearances can be filled with this metallic material so that heat loss caused by the clearances can be restrained. Accordingly, heat exchange efficiencies at heating and cooling times of the dies are improved so that the dies can be rapidly heated and cooled and responsibility of the dies can be improved.

In the present invention, the die temperature detecting means detects a temperature of the dies. The die heating means heats the dies to a predetermined temperature by PID control based on the detected temperature of the dies. Accordingly, after the temperature of the dies is detected, the dies can be heated to the predetermined temperature by PID control based on the detected temperature of the dies. Therefore, the dies can be accurately and rapidly heated without causing any heating overshoot, etc.

In the present invention, the die heating means predicts a time for presetting the temperature of the dies to an object temperature. When the predicted time has passed, the die heating means heats the dies to the predetermined temperature by controlling turning-on and turning-off operations of the heaters. When a time for presetting the die temperature to the object temperature is predicted and this predicted time has passed, the turning-on and turning-off operations of the heaters are controlled so that the die temperature can be heated to the predetermined temperature. Therefore, the aging dies can be accurately and rapidly heated without causing any heating overshoot, etc.

In the present invention, the die cooling speed control means controls the cooling speed of the dies by flowing the refrigerant through a flow passage of the cooling portion of the heat pipes and adjusting the flow rate of the refrigerant. The partition plate adjusts the flow rate of the refrigerant and arranged within the flow passage of the cooling portion. Accordingly, the flow rate of the refrigerant is adjusted by adjusting a flow passage region by the partition plate arranged within the flow passage of the cooling portion so that the cooling speed of the dies can be suitably controlled. Therefore, for example, the flow passage can be suitably narrowed by arranging the partition plate within this flow passage in parallel with an arranging direction of the heat pipes so that a flow speed of the refrigerant flowing through the flow passage can be increased. Accordingly, heat exchange efficiency is improved so that the cooling speed of the dies can be increased and responsibility of the dies can be improved.

In the present invention, the partition plate is arranged in a direction perpendicular to the arranging direction of the heat pipes so that the refrigerant can perpendicularly flow through the heat pipes. Therefore, the plural heat pipes can be uniformly cooled so that it is possible to prevent the dies from being ununiformly cooled. In particular, it is possible to prevent the dies from being ununiformly cooled by a difference in temperature between portions near outflow and inflow ports of the refrigerant.

In the present invention, the honeycomb construction is arranged within the flow passage of the cooling portion so that a cross section of the cooling portion coming in contact with the refrigerant can be increased, thereby rapidly cooling the dies.

In the present invention, the fin is attached to the heat pipes. The die cooling speed control means controls the cooling speed of the dies by adjusting an amount of air supplied from the blower to this fin on the basis of the die temperature. Accordingly, for example, a voltage for rotating a fan motor of the air blower is suitably adjusted by a variable voltage means on the basis of the die temperature detected by a temperature sensor arranged within the dies. The amount of air from the air blower is adjusted on the basis of the die temperature by such electric control so that a cooling temperature of the dies can be controlled. Accordingly, the cooling speed of the dies can be easily controlled.

The die cooling speed control means controls the cooling speed of the dies by adjusting the temperature of cooled air supplied to the fin. Accordingly, the cooling speed of the dies can be controlled by adjusting the temperature of cooled air supplied to the fin. Therefore, the dies can be rapidly cooled by supplying the cooled air to the fin and adjusting its temperature.

In the present invention, the cavities have a telescopic structure and only nested boxes of the telescopic structure are constructed by a material having a high coefficient of thermal conductivity. Accordingly, when molded products as objects are changed, only the nested boxes can be replaced with another. Therefore, useless time, labor and cost are not required to manufacture the dies. Further, all the dies can be constructed without using any expensive material such as a copper alloy having a high efficiency of thermal conductivity, etc. Since only the nested boxes are constructed by a material having a high efficiency of thermal conductivity, the dies can be cheaply manufactured.

In another structure of the present invention, the cooling source has a refrigerant for dipping the exposure portion thereinto and also has a body filled with this refrigerant and having a stirring member for stirring the refrigerant. A cooling speed of the dies is controlled by adjusting a stirring speed of the stirring member.

The cooling source may be constructed by a cooling member having a large coefficient of thermal conductivity. In this case, the cooling speed of the dies is controlled by adjusting a contact area of the cooling member with respect to the exposure portion.

The cooling source may be also constructed by a refrigerator. In this case, the cooling speed of the dies is controlled by electrically adjusting a refrigerating temperature of the refrigerator.

For example, the cooling member having a large coefficient of thermal conductivity is constructed by a material having a coefficient of thermal conductivity equal to or greater than 100 $Wm^{-1}k^{-1}$.

In the present invention, at least a portion of the divisional dies around a cavity is constructed by a member having a large coefficient of thermal conductivity. The plural heat pipes are arranged in an outer circumferential end portion of this member. The temperature of the aging dies is uniformly controlled by adjusting a cooling temperature of the heat pipes.

Accordingly, the heat pipes are spaced from the cavity so that the above member having a high coefficient of thermal conductivity is cooled through the heat pipes. Therefore, a cooling speed of the dies around the cavity is increased so that the temperature of the dies around the cavity is uniformed for a short time and cooling efficiency of the dies is improved. Since the dies are cooled by the heat pipes, the cooling speed of the dies is increased in comparison with a case in which the dies are cooled by the refrigerant.

In the present invention, each of the plural heat pipes is constructed by a buried portion buried into the dies and an exposure portion exposed to the exterior of the dies and connected to a cooling source. Accordingly, no piping for supplying the refrigerant is required so that operability of the dies such as opening and closing operations of the dies is improved. Further, no maintenance of piping in a general die is required. Further, it is not necessary to form a refrigerant passage within the dies so that the dies are easily processed and manufacturing cost of the dies is reduced.

In the present invention, the cooling source may be constructed such that the refrigerant flows through the exposure portion. In this case, the cooling speed of the dies is controlled by adjusting a flow rate of the refrigerant. Accordingly, the cooling speed of the dies is very easily controlled so that cooling efficiency of the dies is improved.

In the present invention, a fin may be attached to the exposure portion and the cooling source may be constructed by an air blower. In this case, the cooling speed of the dies is controlled by adjusting an amount of air supplied to the fin. Accordingly, the cooling speed of the dies is very easily controlled so that cooling efficiency of the dies is improved.

The cooling source may be constructed by a refrigerant for dipping the exposure portion thereinto and a body filled with the refrigerant and movable with respect to the exposure portion. In this case, the body is moved with respect to the exposure portion so that a dipping amount of the refrigerant in the exposure portion is adjusted to control the cooling speed of the dies. Accordingly, the cooling speed of the dies is very easily controlled so that cooling efficiency of the dies is improved.

In another structure of the present invention, the cooling source has a refrigerant for dipping the exposure portion thereinto and also has a body filled with this refrigerant and having a stirring member for stirring the refrigerant. A cooling speed of the dies is controlled by adjusting a stirring speed of the stirring member. Accordingly, the cooling speed of the dies is very easily controlled so that cooling efficiency of the dies is improved.

The cooling source may be constructed by a cooling member having a large coefficient of thermal conductivity. In this case, the cooling speed of the dies is controlled by adjusting a contact area of the cooling member with respect to the exposure portion. Accordingly, the cooling speed of the dies is very easily controlled so that cooling efficiency of the dies is improved.

The cooling source may be also constructed by a refrigerator. In this case, the cooling speed of the dies is controlled by electrically adjusting a refrigerating temperature of the refrigerator. Accordingly, the cooling speed of the dies is very easily controlled so that cooling efficiency of the dies is improved.

For example, the cooling member having a large coefficient of thermal conductivity is constructed by a material having a coefficient of thermal conductivity equal to or greater than 100 $Wm^{-1}k^{-1}$. Accordingly, the temperature of a die portion around the cavity is easily uniformed and a function for controlling the cooling speed of the dies by the heat pipes is sufficiently fulfilled.

In accordance with a fifth structure of the present invention, the aging device further comprises a molded product conveying plate for arranging a plurality of preprocessed plastic base materials thereon; positioning means for moving and positioning the molded product conveying plate such that the plural plastic base materials can be located on piece portions of the opened aging dies after the plural plastic base materials are arranged on the molded product conveying plate; and inserting means for inserting the plural plastic base materials into the aging dies simultaneously when the molded product conveying plate is positioned by the positioning means; the positioning means and the inserting means being arranged in the molded product conveying plate.

The above inserting means has means for taking a molded product out of the aging dies after completion of the aging process.

In the present invention, two molded product conveying plates or more may be arranged to simultaneously insert the plastic base materials into the molded product conveying plates and take the molded product out of the aging dies in addition to the aging process.

In accordance with a ninth structure of the present invention, the molded product conveying plate is preferably constructed by the same material as the aging dies or a material having a coefficient of thermal conductivity equal to that of the aging dies.

The molded product conveying plate may have a heat insulating station for holding temperatures of the plastic base materials and the molded product conveying plate in advance before the molded product conveying plate is inserted into the aging dies.

In the present invention, after the plural plastic base materials are arranged in the molded product conveying plate, the molded product conveying plate is moved and positioned such that the plastic base materials are located on piece portions of the opened aging dies. Simultaneously, the plural plastic base materials can be inserted into the aging dies. Therefore, a cyclic time of the aging process can be reduced.

In another structure of the present invention, the inserting means inserts the plural plastic base materials into the aging dies and can simultaneously take a molded product obtained after completion of the aging process out of the aging dies. Therefore, a cyclic time of the aging process can be reduced.

In another structure of the present invention, the plastic base materials are heated and cooled by using two molded product conveying plates or more in the aging process. Simultaneously, the plastic base materials can be inserted and taken out of the molded product conveying plates. Therefore, a cyclic time of the aging process can be reduced.

In another structure of the present invention, the molded product conveying plate is preferably constructed by the same material as the aging dies or a material having a coefficient of thermal conductivity equal to that of the aging dies. Accordingly, no irregular temperature distribution of the aging dies is easily caused in heating and cooling processes in the aging process in comparison with a case in which no molded product conveying plate is constructed by the same material as the aging dies or a material having a coefficient of thermal conductivity equal to that of the aging dies. Therefore, the aging dies can be uniformly heated and cooled.

The molded product conveying plate may have a heat insulating station for holding temperatures of the plastic base materials and the molded product conveying plate in advance before the molded product conveying plate is inserted into the aging dies. In this case, the temperatures of the plastic base materials can be held before the plastic base materials are inserted into the aging dies. Therefore, a temperature width of each of the plastic base materials required for heating can be reduced so that a heating time of each of the plastic base materials can be reduced and a cyclic time of the aging process can be reduced.

In accordance with a tenth structure of the present invention, the above objects can be also achieved by a method for manufacturing a molded product of resin, comprising the steps of an injection molding process and an aging process separated from each other. The injection molding process including the steps of heating a predetermined resin base material to a temperature equal to or higher than a fluidizable temperature thereof; injection-molding the resin base material into a die held at a temperature equal to or lower than a thermal deforming temperature of the resin base material; and forming a gate seal. The aging process including the steps of inserting the preprocessed resin base material into an aging die having at least one mirror face and a plurality of cavities set such that a temperature of the resin base material is equal to or higher than a glass transition temperature; holding the resin base material for a predetermined time at a temperature equal to or higher than the glass transition temperature so that an internal resin pressure is generated; and gradually cooling the resin base material to a temperature equal to or lower than the thermal deforming temperature and transferring the mirror face thereto.

In accordance with an eleventh structure of the present invention, the preprocessed resin base material is inserted into the aging die in combination with at least one kind of a resin base material being different from the preprocessed resin base material.

In the above structure, aging materials of at least one kind are made of thermoplastic resin.

In accordance with a thirteenth structure of the present invention, an aging temperature of the aging die is set to be equal to or higher than a lowest glass transition temperature of combined resins. Further, a taking-out temperature of the resin base material after aging of the aging die is set to be equal to or lower than the lowest glass transition temperature of the combined resins.

The cavities of the aging die are set to be in a vacuum state at an aging time.

In the present invention, resin is combined with a material of at least one kind different from resin. This combinational material is inserted into the aging die set such that a temperature of this aging die is equal to or higher than the glass transition temperature of resin. Thereafter, the combinational material is held for a predetermined time at a temperature equal to or higher than the glass transition temperature of resin. Further, the combinational material including resin is gradually cooled to a temperature equal to or lower than the thermal deforming temperature of resin. Accordingly, an integral molded product is manufactured with high accuracy by melting and joining resin with a different kind of material. Further, it is possible to obtain a molded product usefully using characteristics of the different material by suitably selecting used materials. Furthermore, a degree of freedom in design of the molded product is improved.

In the present invention, the aged materials of at least one kind are constructed by thermoplastic resin. Accordingly, the plural materials are easily integrated with each other in a melting state of resin and a mirror face is easily transferred to resin.

In the present invention, an aging temperature of the aging die is set to be equal or higher than a lowest glass transition temperature of combined resins. Accordingly, the combined materials are rapidly melted and integrated with each other so that an aging time is reduced.

In another structure of the present invention, a taking-out temperature of the resin materials after aging of the aging die is set to be equal or lower than the lowest glass transition temperature of the combined resins. Accordingly, the different materials are cooled and reliably integrated with each other and are then taken out of the aging die so that the quality of a molded product is improved.

The cavities of the aging die are maintained in a vacuum state at an aging time. Accordingly, no air bubbles are mixed and flowed to a central portion of joining faces of materials in the aging process. Accordingly, no air bubbles are mixed and flowed into a central portion of the integrated molded product so that the quality of the molded product is improved.

In another manufacturing method of a plastic molded product in the present invention, a resin base material is approximately preprocessed in a final shape in advance by injection molding. This resin base material is inserted into a cavity of an aging die having at least one mirror face in an aging process. In this aging process, the resin base material is then held for a predetermined time at a temperature equal to or higher than a glass transition temperature of this resin. Thereafter, the resin base material is gradually cooled to a temperature equal to or lower than a thermal deforming temperature of this resin in the aging process. A mirror face is transferred to the resin base material by an internal resin pressure generated by melting the resin base material.

In accordance with a twelfth structure of the present invention, in the above manufacturing method, at least two or more resin base materials preprocessed by injection molding are inserted into the same cavity of the aging die and are aged so that an integral molded product is manufactured by melting and joining the at least two or more resin base materials with each other.

The resin base materials are melted and joined with each other within the cavity such that each of joining faces of the two resin base materials or more is formed in a direction not parallel to a parting face of the aging die.

The resin base materials are preferably molded by injection molding such that each of the resin base materials has a uniform thickness.

The molded product having a predetermined shape is manufactured by freely replacing each of the two resin base materials or more with another in a predetermined position within the cavity.

In the present invention, opposite joining faces of the two resin base materials or more are formed in a convex shape in advance by injection molding and are joined with each other. The resin base materials are then inserted into the cavity of the aging die.

In the present invention, the cavity of the aging die is set to be in a vacuum state in the above aging process.

In the above manufacturing method, the two resin base materials or more preprocessed by injection molding are inserted into the same cavity of the aging die and are aged. Thus, the two resin base materials or more are melted and joined with each other so that an integral molded product is manufactured.

Accordingly, the resin base materials approximately preprocessed in a final shape by injection molding are divided into two divisional portions or more. Namely, the resin base materials can be molded twice or more so that die clamping force is reduced at each of injection-molding times. Therefore, a large-sized long molded product is easily manufactured by a compact molding machine so that manufacturing cost of the molded product is reduced. When the molded product has a complicated shape, no base materials are easily inserted into the aging die by thermal shrinkage in the injecting process. However, when the base materials are divided, the base materials are easily inserted into the aging die.

In the present invention, the resin base materials are joined with each other within the cavity such that each of joining faces of the two resin base materials or more is formed in a direction not parallel to a parting face of the aging die. Accordingly, a divisional direction of the resin base materials approximately preprocessed in a final shape is in conformity with a clamping direction of the aging die so that the die clamping force is further reduced at an injection molding time. The resin base materials are molded by injection molding such that each of the resin base materials has a uniform thickness. Accordingly, the resin base materials are joined with each other and are easily formed in a shape in which each of the resin base materials has a different thickness. In this case, no contraction of the molded product is caused.

The molded product having a predetermined shape is manufactured by replacing each of the two resin base materials or more with another in a predetermined position within the cavity. Accordingly, it is possible to manufacture molded products having various kinds of shapes.

In the present invention, opposite joining faces of the two resin base materials or more are formed in a convex shape in advance by injection molding and are joined with each other. The resin base materials are then inserted into the cavity of the aging die. Accordingly, it is possible to prevent air bubbles from being mixed and flowed to a central portion of the joining faces of the resin base materials in the aging process. When the joining faces of the resin base materials inserted into the cavity of the aging die are planar, air bubbles tend to be mixed and flowed to the central portion of the joining faces. However, when the joining faces are formed in a convex shape, no air bubbles are mixed and flowed into a central portion of a molded product obtained by integrating the resin base materials with each other so that a quality of the molded product is improved.

In the present invention, the cavity of the aging die is set to be in a vacuum state in the aging process. Accordingly, no air bubbles are mixed and flowed to a central portion of the joining faces of the resin base materials in the aging process. Therefore, no air bubbles are mixed and flowed into a central portion of the molded product obtained by integrating the resin base materials with each other so that a quality of the molded product is improved.

In accordance with a fourteenth structure of the present invention, the above objects can be also achieved by a method for manufacturing a plastic mirror, comprising the steps of preparing a pair of dies opposed to each other and having at least one mirror face forming at least one cavity; preparing a thermoplastic base material approximately pre-processed in a final shape in advance; preparing a plastic film having a metallic reflecting film having an area equal to or smaller than that for the mirror face of the dies; inserting the plastic film and the plastic base material into the cavity such that the plastic film on a side of the metallic reflecting film comes in contact with the mirror face and the plastic base material is located on a rear face side of the metallic reflecting film of the plastic film; clamping and heating the dies such that the plastic base material is heated to a temperature equal to or higher than a glass transition point, or is vibrated and pressurized at a temperature close to the glass transition point so as to generate a predetermined internal resin pressure within the cavity; transferring the mirror face to the metallic reflecting film of the plastic film; and gradually cooling the dies and taking the plastic base material out of the cavity when a temperature of the plastic base material is equal to or lower than a thermal deforming temperature.

The metallic reflecting film of the plastic film is formed by electroless plating, evaporation or sputtering.

In accordance with a fifteenth structure of the present invention, the plastic base material is constructed by using amorphous resin.

In accordance with a sixteenth structure of the present invention, the plastic base material and the plastic film are constructed by the same material.

In accordance with a seventeenth structure of the present invention, an adhesive layer of a heat curing type or a hot melting type is formed in advance on at least one side of a plastic film joining face side of the plastic base material and the rear face side of the metallic reflecting film of the plastic film. The plastic base material and the plastic film are inserted into the cavity and are joined with each other such that the adhesive layer is located between the plastic base material and the plastic film.

The plastic base material is constructed by using an amorphous plastic composite material including a reinforced filler such as fibers.

In accordance with a twentieth structure of the present invention, the plastic film has a thickness of 50 μm to 800 μm.

At least one of the plastic base material or the plastic film is heated to a deformable temperature in advance and is then inserted into the cavity.

For example, after the plastic film is heated to the deformable temperature in advance, the plastic film is deformed in a shape approximately equal to a mirror face shape and is then inserted into the cavity.

At least one of contact surfaces of the plastic base material and the plastic film may be chemically or physically processed such that this contact surface has a predetermined surface roughness.

A protecting film may be formed on a surface of the metallic reflecting film of the plastic film.

In accordance with a nineteenth structure of the present invention, the plastic film having the metallic reflecting film includes an inserting portion inserted onto the mirror face of the dies; an engaging portion formed in the vicinity of the inserting portion and engaged with a positioning portion formed in the dies when the inserting portion is located on the mirror face; and a supporting portion for supporting the inserting portion. The inserting portion, the engaging portion and the supporting portion are continuously formed in a feeding direction of the plastic film. The plastic film is fed out by a film supplying device and is inserted into the dies such that the metallic reflecting film in the inserting portion comes in contact with the mirror face. The plastic base material is inserted into the dies by a base material supplying device such that the plastic base material is located on the rear face side of the metallic reflecting film in the inserting portion. The dies are next clamped. The inserting portion is continuously cut from the supporting portion in accordance with a feeding amount of the plastic film before or after the plastic base material is melted.

In another structure of the present invention, the plastic base material and the plastic film are inserted into the cavity and the die is clamped.; Thereafter, a predetermined internal resin pressure is generated within the cavity while the cavity is vacuumed.

In accordance with an eighteenth structure of the present invention, a face of the plastic base material coming in contact with the plastic film has a radius of curvature smaller than that of the mirror face when the mirror face of the dies is formed in a convex shape. This face of the plastic base material coming in contact with the plastic film has a radius of curvature larger than that of the mirror face when the mirror face of the dies is formed in a concave shape.

In accordance with a sixth structure of the present invention, the aging device further comprises a mirror forming means. The mirror forming means includes a molding means for heating the inserting portion of the plastic film to a deformable temperature thereof and forming the inserting portion as a mirror face approximately having a final shape before the plastic film is inserted into the cavities of the divisional dies; base material supplying means for supplying the plastic base material into the cavities; film supplying means for conveying the inserting portion of the plastic film to a position of the mirror face of the divisional dies; cutting means for cutting the inserting portion from the supporting portion of the plastic film; and taking-out means for taking out a molded product cut and separated from the plastic film. The plastic film has a metallic reflecting film for transferring the mirror face thereto and the metallic reflecting film has an area equal to or smaller than that for the mirror face of the divisional dies. The plastic film includes an inserting portion for inserting the plastic film onto the mirror face of the divisional dies; an engaging portion formed in the vicinity of the inserting portion and engaged with a positioning portion formed in the divisional dies when the inserting portion is located on the mirror face; and a supporting portion for supporting the inserting portion. The inserting portion, the engaging portion and the supporting portion are continuously formed in a feeding direction of the plastic film.

Amorphous resin is constructed by alkali resin, polycarbonate resin, amorphous polyolefin, etc.

A reinforced material is constructed by glass fibers, carbon fibers, mica, etc. to improve strength and Young's modulus.

In the above aging device, the metallic reflecting film is formed on one face side of the plastic film. The plastic base material is approximately formed in a final shape. The plastic film and the plastic base material are inserted into the cavity of the die. The plastic base material is melted so that an internal resin pressure is generated within the cavity. After the internal resin pressure reaches a predetermined pressure, the plastic film and the plastic base material are gradually cooled to a temperature equal to or lower than a thermal deforming temperature and are joined with each other without causing distortion and stress. At this time, the metallic reflecting film is pressed against the mirror face of the die by the internal resin pressure. Accordingly, a mirror face having a high accuracy is formed on the metallic reflecting film even when the metallic reflecting film has an ununiform thickness.

The metallic reflecting film is formed by evaporation or sputtering to uniform the thickness of the metallic reflecting film. However, the mirror face of the die can be transferred to the metallic reflecting film with high accuracy even when the thickness of the metallic reflecting film is ununiform. Accordingly, the metallic reflecting film can be formed on one face side of the plastic film by using electroless plating at low cost.

In another structure of the present invention, the mirror face has a high accuracy since the plastic base material is constructed by using amorphous resin having a good transfer property.

The plastic base material and the plastic film may be constructed by the same material. In this case, adhesive and joining properties of the plastic base material and the plastic film are improved. Since the plastic film and the plastic base material are integrated with each other, influences of stress, temperature, humidity, etc. on the plastics film and the plastic base material are reduced.

In the present invention, an adhesive layer is formed on at least one of a plastic film joining face side of the plastic base material and a rear face side of the metallic reflecting film of the plastic film. Accordingly, the plastic base material and the plastic film are joined with each other through the adhesive layer. Therefore, adhesive and joining properties of the plastic film and the plastic base material are improved.

In the present invention, the plastic base material is constructed by using an amorphous plastic composite material including a reinforced filler such as fibers. Accordingly, it is possible to prevent a shape of the mirror face from being deformed by changes in stress, temperature, etc.

The plastic film preferably has a thickness of 50 μm to 800 μm. When the plastic film having a thickness less than 50 μm is used, mechanical stress is caused at an inserting time of the plastic film into the die and thermal stress is caused at a heating time of the plastic film. Therefore, the metallic reflecting film is deformed with wrinkles by the mechanical and thermal stresses. However, in the present invention, it is possible to prevent the metallic reflecting film from being deformed with wrinkles by the mechanical and thermal stresses. Further, an influence of composition of the plastic base material on the metallic reflecting film is prevented. In contrast to this, when the plastic film having a thickness greater than 800 μm is used, the metallic reflecting film tends to be deformed with wrinkles and cracked when the mirror face of the die is transferred in the general aging device. Further, in the general aging device, distortion is caused by a difference in thermal shrinkage factor between the metallic reflecting film and the plastic base material so that transfer accuracy of the mirror face is reduced. However, in the present invention, such problems are not caused.

In the present invention, at least one of the plastic base material and the plastic film is heated to a deformable temperature in advance. Accordingly, it is possible to prevent distortion caused when the mirror face of the die is transferred to the plastic film. Therefore, a reduction in transfer accuracy can be prevented. Further, a molding cycle of the aging device is reduced.

In the present invention, the plastic film is inserted into the cavity after the plastic film is heated to the deformable temperature in advance and is molded in a shape approximately equal to that of the mirror face of the die. Accordingly, the plastic film is easily inserted into the die so that the transfer accuracy of the mirror face of the die is further improved.

As mentioned above, at least one of contact surfaces of the plastic base material and the plastic film may be chemically or physically processed such that this contact surface has a predetermined surface roughness. In this case, adhesive and joining properties of the plastic film and the plastic base material are further improved.

When a protecting film is formed on a surface of the metallic reflecting film of the plastic film, it is possible to prevent mechanical deterioration of the metallic reflecting film and deterioration of the metallic reflecting film with the passage of time.

In the present invention, the engaging portion is engaged with the positioning portion of the die to position the inserting portion. The inserting portion and the plastic base material are inserted into the die and the die is clamped. The supporting portion is cut before or after the plastic base material is melted. Accordingly, the inserting portion of the plastic film can be automatically inserted into the die. Further, a molded product can be automatically discharged from the die. The metallic reflecting film is not formed on an entire surface of the plastic film, but may be formed in only the inserting portion. In this case, it is possible to form the metallic reflecting film in accordance with a mirror shape.

While the cavity is vacuumed, the plastic film is melted to generate an internal resin pressure within the cavity. The plastic base material and the plastic film are then joined with each other. Accordingly, it is possible to prevent a reduction in transfer accuracy of the mirror face of the die by air, etc. flowed into a clearance between the plastic film and the plastic base material.

In accordance with the eighteenth structure of the present invention, a face of the plastic base material coming in contact with the plastic film has a radius of curvature smaller than that of the mirror face when the mirror face of the dies is formed in a convex shape. This face of the plastic base material coming in contact with the plastic film has a radius of curvature larger than that of the mirror face when the mirror face of the dies is formed in a concave shape. Accordingly, when the plastic base material and the plastic film are inserted into the die and the die is clamped, a contact face of the plastic base material with respect to the plastic film comes in close contact with the mirror face through the plastic film so that the transfer accuracy of the mirror face of the die is further improved.

In the present invention, the inserting portion of the plastic film is heated by a molding means to a deformable temperature and is formed in a shape approximately equal to that of the mirror face of the die. Accordingly, the inserting portion is easily inserted into the cavity and the plastic base material is inserted into the cavity by a base material supplying means. Next, an internal resin pressure is generated within the cavity by applying a predetermined pressure to the cavity by a pressurizing means and heating the plastic base material and the plastic film to a predetermined temperature by a heating-cooling means. The mirror face of the die is then transferred to the inserting portion. The plastic base material and the plastic film are joined with each other and are gradually cooled with a gradient of a predetermined temperature. Accordingly, the mirror face of the die is transferred with high accuracy without applying stress to the inserting portion.

After the plastic base material and the plastic film are joined with each other, the supporting portion is cut by a cutting means so that a molded product is taken out by a taking-out means. Accordingly, the plastic film and the plastic base material are automatically and continuously inserted into the die, and the molded product is automatically and continuously taken out of the die. Therefore, productivity of the molded product is improved and a quality of the molded product is stabilized.

Further objects and advantages of the present invention will be apparent from the following description of the preferred embodiments of the present invention as illustrated in the accompanying drawings.

BRIEF DESCRIPTION OF THE DRAWINGS

FIG. 4b is a view showing a state in which a cover is arranged around a fin in the cooling device shown in FIG. 4a;

FIG. 28 is a cross-sectional view of an aging die for achieving a manufacturing method of a plastic molded product in another embodiment of the present invention;

DESCRIPTION OF THE PREFERRED EMBODIMENTS

The preferred embodiments of an aging device and manufacturing methods of a molded resin product and a plastic mirror in the present invention will next be described in detail with reference to the accompanying drawings.

Embodiment 1

Figure 1:
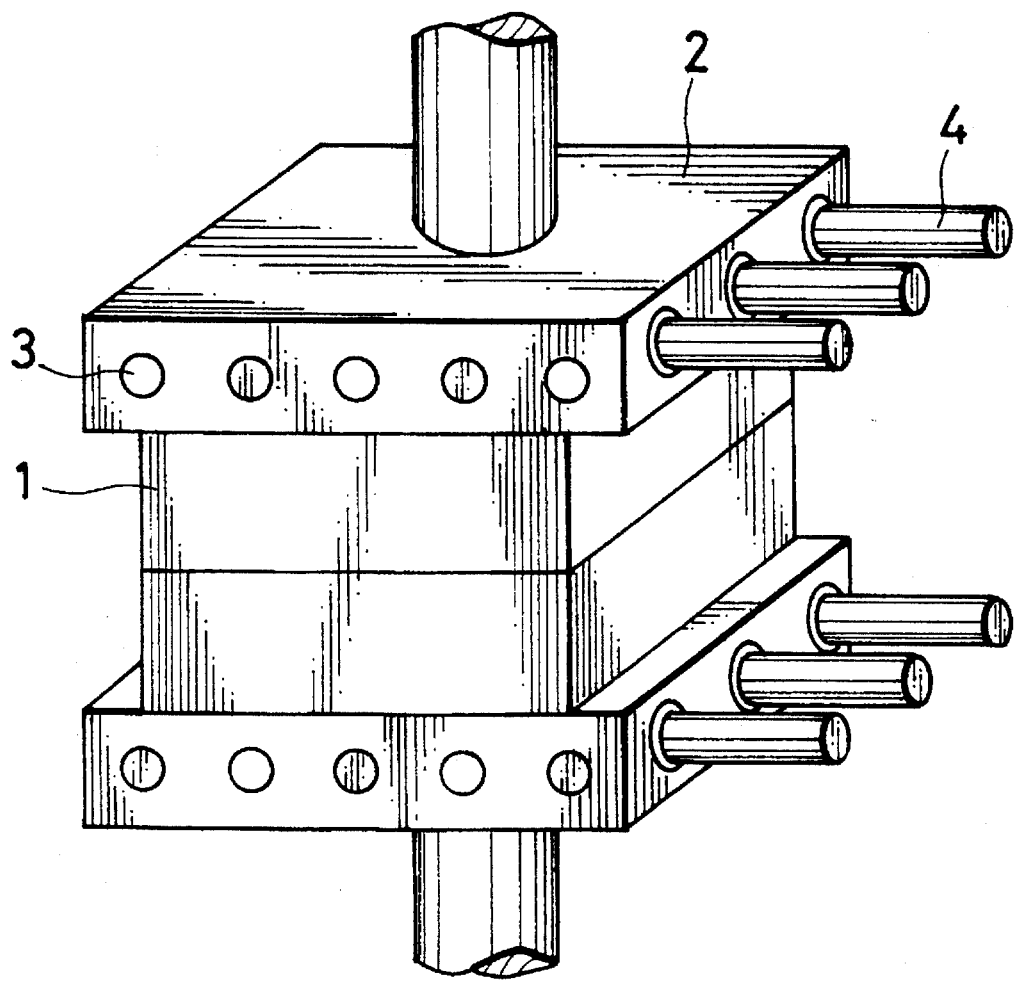
FIG. 1 is a schematic perspective view showing the construction of an aging device in accordance with one embodiment of the present invention.

FIG. 1 is a schematic perspective view showing the construction of an aging device in accordance with one embodiment of the present invention. FIG. 1 schematically shows a die plate and an aging die. In FIG. 1, reference numerals 1 and 2 respectively designate an aging die and a die plate of a press machine having a heater 3 and a heat pipe 4. In this embodiment, as shown in FIG. 1, the die 1 is heated and cooled by arranging the heater 3 and the heat pipe 4 of the aging device in the die plate 2 of the press machine. Therefore, it is not necessary to arrange the heat pipe 4 and the heater 3 in a replaced die 1 every time the die 1 is newly replaced with another. Accordingly, it is possible to prevent a die structure from being complicated and time, labor and useless cost are not required to manufacture the die.

The die plate of the press machine having the heater 3 and the heat pipe 4 may be constructed such that this die plate can be replaced with a normal die plate in which heaters and heat pipes are not arranged. In this case, the die plate 2 having the heater 3 and the heat pipe 4 can be suitably replaced with the normal die plate in which no heaters and heat pipes are arranged. Therefore, when it is necessary to dispose the heat pipe 4 and the heater 3 in the die 1 in accordance with a molded product, it is possible to use the die 1 having the heat pipe 4 and the heater 3 so that the die can be used for general purpose.

A temperature sensor is arranged within the die 1 and constitutes a heating means of the above aging device. The temperature sensor detects a temperature of the die 1. The aging device may be constructed such that the die 1 is heated to an object temperature by PID control on the basis of the detected temperature of the die 1. In this case, the die 1 can be heated to a predetermined temperature based on the detected temperature of the die 1. Accordingly, the die 1 can be rapidly heated accurately without causing any heating overshoot, etc.

The aging device may be constructed such that a time required to heat the die 1 to the object temperature is predicted in advance in consideration of the overshoot and the heater is set to be turned off at this predicted time. In this case, no heater is turned on and off while the die is heated. Accordingly, the die can be heated rapidly.

Clearances are inevitably formed between the heater 3, the heat pipe 4 and the die 1 so that a large heat loss is caused by the clearances. Therefore, a metal may be buried into these clearances so that the heat loss caused by the clearances is reduced. In such a structure, heat exchange efficiency is improved at each of heating and cooling times of the die so that heating and cooling speeds of the die can be increased and responsibility of the die can be also improved. This metal is desirably constructed by using a low melting point metal having a melting point equal to or higher than a heating temperature of the aging die 1 in consideration of heat-resisting property.

Embodiment 2

Figure 2:
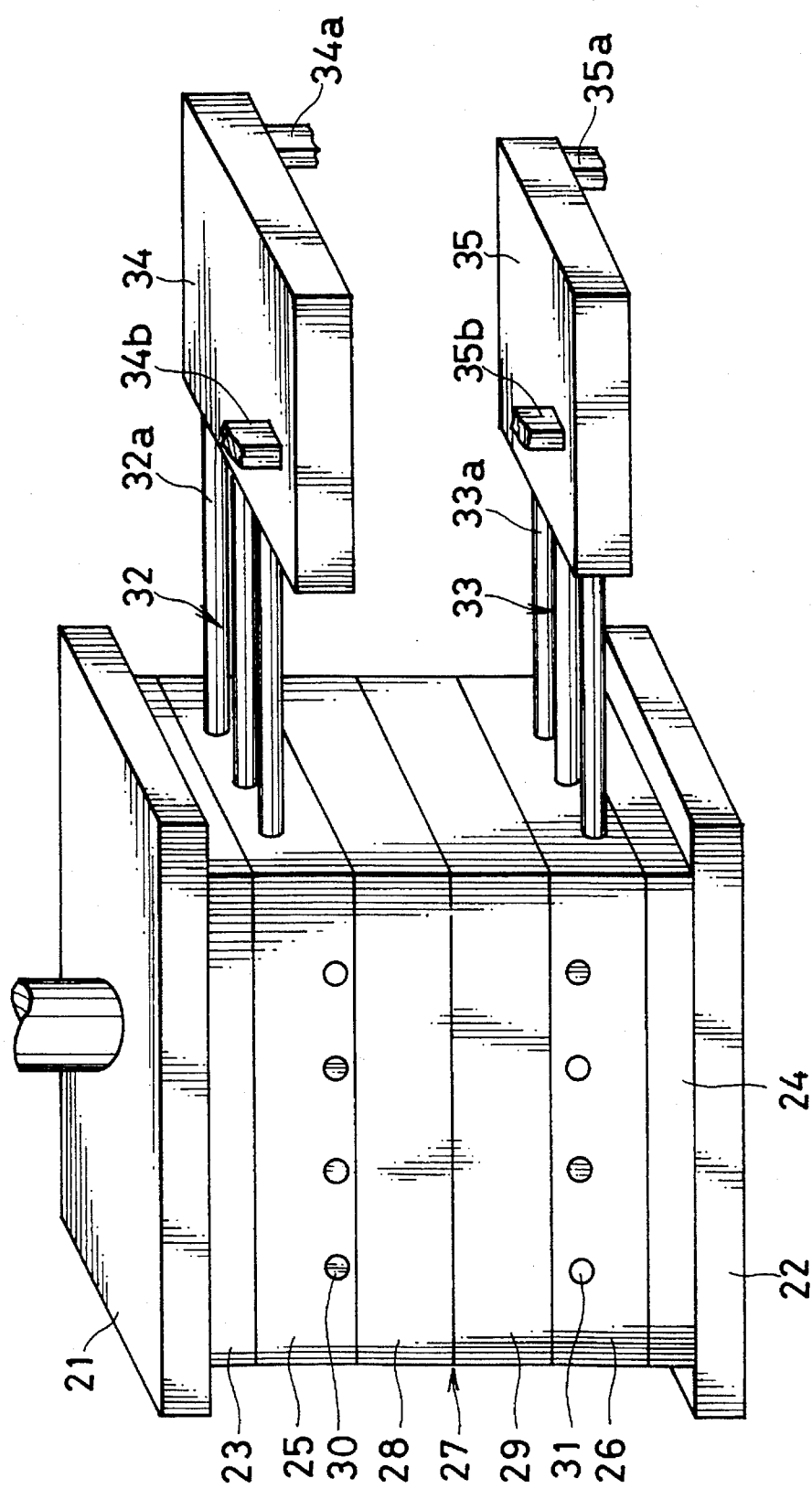
FIG. 2 is a perspective view of a cooling device for cooling a die for plastic molding in accordance with another embodiment of the present invention.
Figure 3:
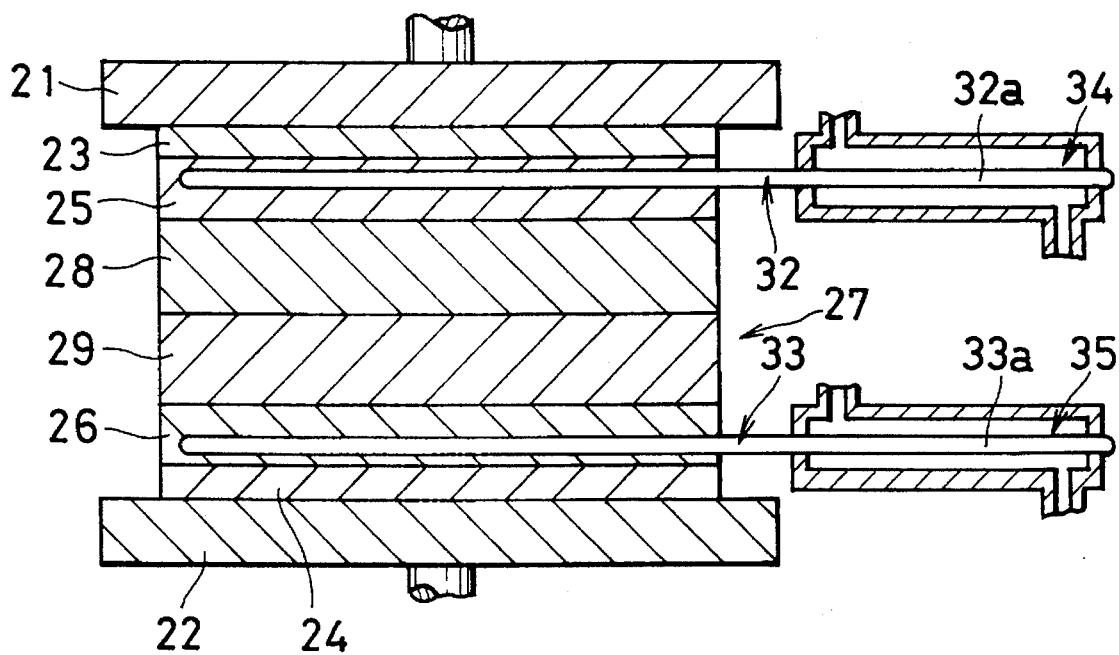
FIG. 3 is a cross-sectional view of the cooling device of the die for plastic molding in the embodiment of FIG. 2.

Each of FIGS. 2 and 3 shows a device for cooling a die for plastic molding in accordance with another embodiment of the present invention.

This cooling device is constructed as follows. Each of reference numerals 21 and 22 designates a die plate of a hydraulic press machine. Heating-cooling members 25 and 26 are respectively attached to the die plates 21 and 22 through heat insulating materials 23 and 24. A die 27 for plastic molding is attached to the heating-cooling members 25 and 26. This die 27 is constructed by a pair of divisional dies 28 and 29 opposed to each other. The divisional dies 28 and 29 form at least one cavity and have at least one mirror face.

For example, each of the divisional dies 28 and 29 is formed by a material having a high coefficient of thermal conductivity of 100 $Wm^{-1}k^{-1}$. This material is made of copper, a copper alloy, aluminum, an aluminum alloy, silicon (Sic) ceramic, etc. The die plates 21 and 22 are moved by the hydraulic press machine in a vertical direction so that the divisional dies 28 and 29 are opened and closed. When the divisional dies 28 and 29 are opened, a plastic base material is inserted into the cavity of the divisional dies. In this embodiment, for brevity, the die 27 is constructed by the divisional dies 28 and 29, but includes the heating-cooling members 25 and 26.

A plurality of heaters 30 and 31 are respectively buried into the heating-cooling members 25 and 26. The heaters 30 and 31 are connected to an unillustrated heating source. The die 27 is heated by heating the heaters 30 and 31 by this heating source.

A plurality of heat pipes 32 and 33 are respectively arranged in the heating-cooling members 25 and 26. The heat pipes 32 and 33 are arranged such that these heat pipes 32 and 33 are respectively perpendicular to the heaters 30 and 31. However, the heat pipes 32 and 33 may be arranged such that these heat pipes 32 and 33 are respectively parallel to the heaters 30 and 31.

The heat pipes 32 and 33 are respectively constructed by buried portions buried within the heating-cooling members 25 and 26 and exposure portions 32a and 33a. The exposure portions 32a and 33a are respectively exposed from the heating-cooling members 25 and 26 and are respectively attached to supplying sources 34 and 35.

The supplying sources 34 and 35 are constructed such that a refrigerant flows through each of the exposure portions 32a and 33a. The supplying sources 34 and 35 respectively have introducing ports 34a and 35a for introducing the refrigerant into the supplying sources 34 and 35 and formed in predetermined positions of the supplying sources 34 and 35. The supplying sources 34 and 35 also respectively have discharging ports 34b and 35b for discharging the refrigerant from the supplying sources 34 and 35. The introducing ports 34a and 35a are connected to an unillustrated refrigerant supplying device for adjusting a supplying amount of the refrigerant. The heat pipes 32, 33 and the supplying sources 34, 35 constitute a cooling device.

An operation of the cooling device in this embodiment shown in FIG. 2 will next be explained.

A thermoplastic base material is preprocessed in a final shape in advance and is inserted into the die 27. Thereafter, the die 27 is heated to a temperature equal to or higher than a glass transition temperature of the plastic base material by heating the heaters 30 and 31 so that the plastic base material is melted. At this time, heating of the heaters 30 and 31 may be temporarily stopped. When the plastic base material is melted, a predetermined resin pressure is generated within the cavity so that a mirror face is transferred to the plastic base material. At this time, no refrigerant is supplied to the heat pipes 32 and 33 so that an amount of heat escaped from the buried portions is minimized when the die 27 is heated.

Next, the refrigerant is supplied to the heat pipes 32 and 33 so that a portion of the die 27 around the cavity is cooled through the heat pipes 32 and 33. At this time, a cooling speed of the die 27 is controlled by adjusting a flow rate of the refrigerant, or constantly setting the flow rate to temporarily stop the supply of the refrigerant. When the temperature of the die 27 is reduced to a temperature equal to or lower than a thermal deforming temperature of resin, a plastic molded product is taken out of the cavity so that a molding operation is completely performed.

In this embodiment, the divisional dies 28 and 29 are constructed by a material having a large coefficient of thermal conductivity. The plural heat pipes 32 and 33 are arranged in the vicinity of outer circumferential end portions of the divisional dies 28 and 29. The operation of the cooling device is controlled such that the temperature of the die 27 is uniformly set by adjusting a cooling temperature of each of the heat pipes 32 and 33. Accordingly, the heat pipes 32 and 33 can be separated from the cavity, and the die 27 having a high coefficient of thermal conductivity can be cooled through the heat pipes 32 and 33.

Therefore, the cooling speed of the die 27 around the cavity can be increased so that the temperature of the die around the cavity can be uniformly set for a short time and cooling efficiency of the die 27 can be improved. Further, since the die 27 is cooled by the heat pipes 32 and 33, the cooling speed of the die 27 can be increased in comparison with a structure in which the die 27 is cooled by the refrigerant.

The plural heat pipes 32 and 33 are respectively constructed by the buried portions buried within the heating-cooling members 25 and 26, and the exposure portions 32a and 33a externally exposed from the heating-cooling members 25 and 26 and connected to the cooling sources 34 and 35. Accordingly, no piping for supplying the refrigerant is required and it is possible to improve operability of the die 27 when the die 27 is opened and closed. Further, it is not necessary to maintain piping as in the general cooling device. Furthermore, since it is not necessary to process and form a refrigerant passage within the die 27, the die 27 can be easily processed so that manufacturing cost of the die 27 can be reduced.

Each of the cooling sources 34 and 35 is constructed by a structure for flowing the refrigerant through the exposure portions 32a and 33a. The cooling speed of the die 27 is controlled by adjusting a flow rate of the refrigerant. Accordingly, the cooling speed of the die 27 can be very easily controlled so that cooling efficiency of the die 27 can be improved. In this embodiment, the heat pipes 32 and 33 are respectively arranged in the heating-cooling members 25 and 26 in an outer circumferential portion of the die 27, but may be directly arranged within the die 27.

Figure 5:
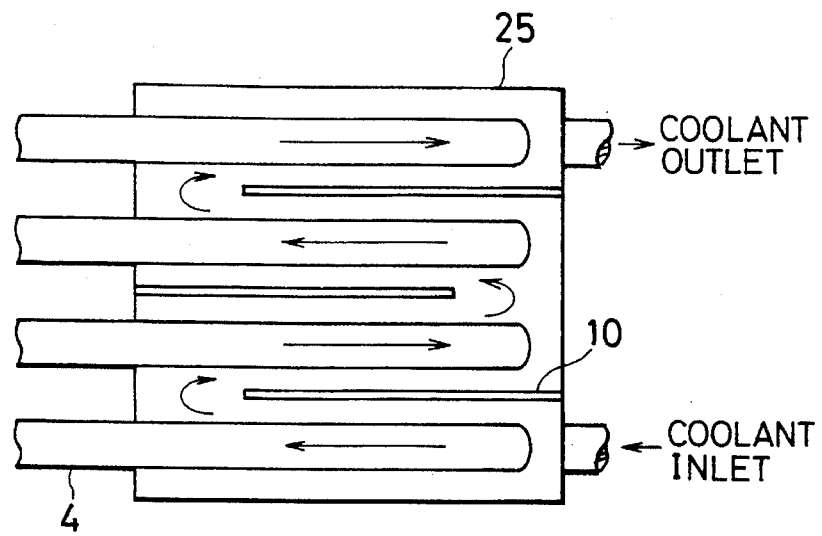
FIG. 5 is a view showing a method for cooling the aging device.
Figure 6:
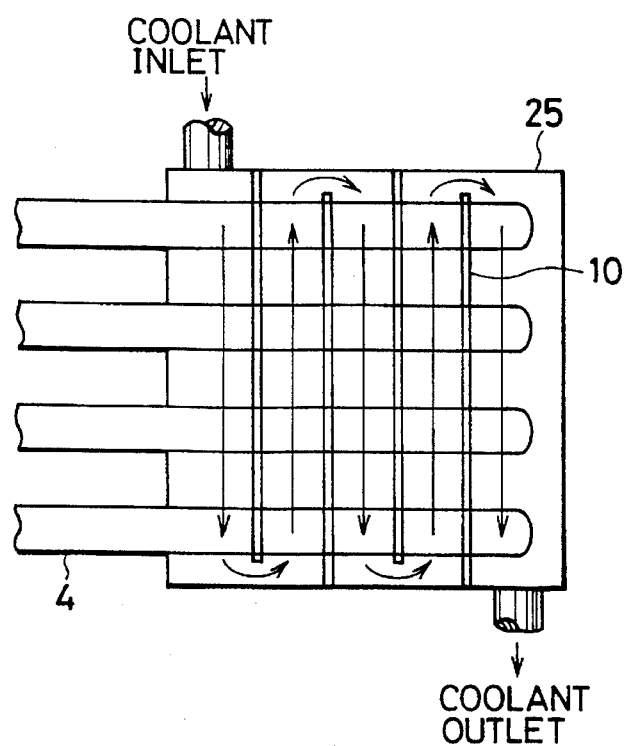
FIG. 6 is a view showing a method for cooling the aging device.

The next description relates to a method for flowing the refrigerant through the exposure portions of the heat pipes 32 and 33 shown in FIG. 3. In this method, as shown in FIG. 5, a partition plate 10 is arranged within a flow passage of a cooling portion 25 such that the partition plate 10 is parallel to an arranging direction of heat pipes 4 within the cooling portion 25. The flow passage may be suitably set to be narrowed by this partition plate 10. In this case, a flow speed of the refrigerant flowing through the flow passage can be increased so that heat exchange efficiency is improved and a cooling speed of the die can be preferably controlled and increased. As shown in FIG. 6, the partition plate 10 may be arranged in a direction perpendicular to the arranging direction of the heat pipes 4. In this case, the refrigerant can flow through the heat pipes 4 in a direction perpendicular to the heat pipes 4. Accordingly, the plural heat pipes 4 can be more uniformly cooled so that it is possible to prevent the die 1 from being ununiformly cooled. In particular, it is possible to prevent the die from being ununiformly cooled by a difference in temperature between pipe portions near inflow and outflow ports of the refrigerant.

Embodiment 3

Figure 4A:
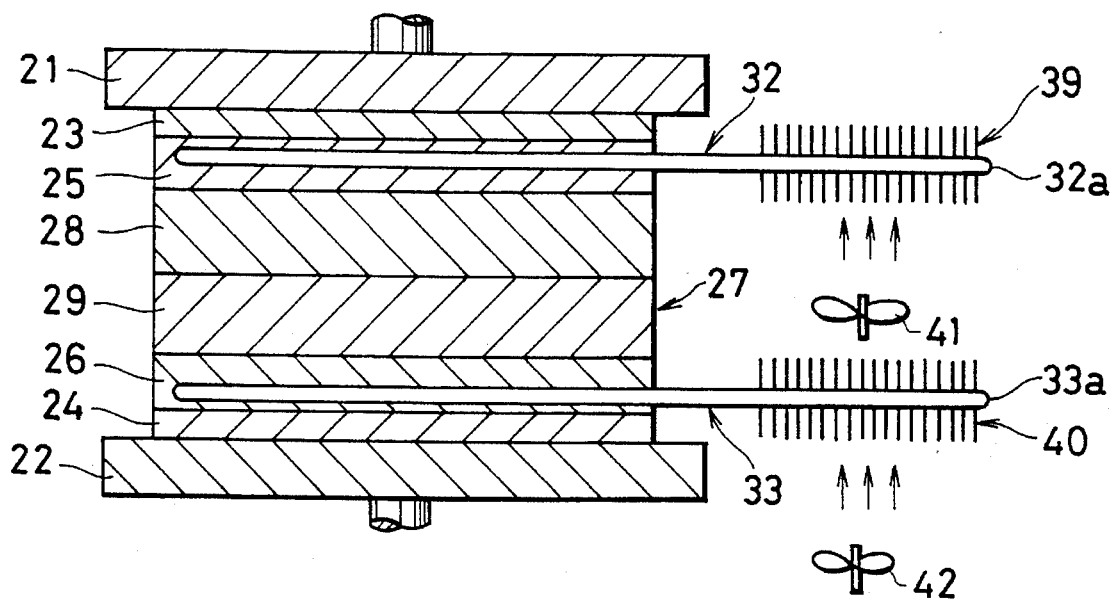
FIG. 4a is a cross-sectional view of a cooling device for cooling a die for plastic molding in accordance with another embodiment of the present invention.
Figure 4B:
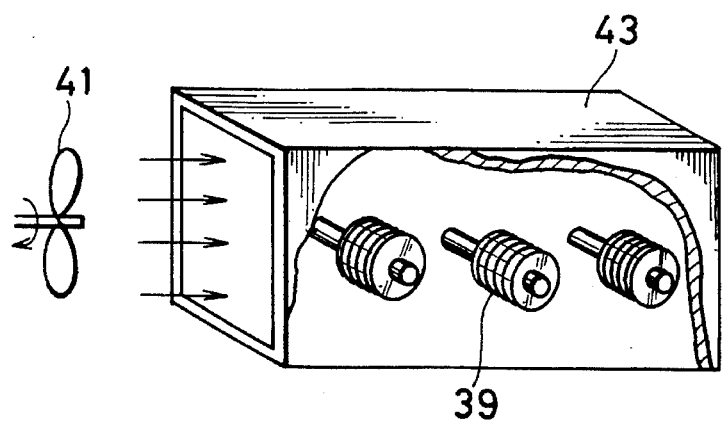

FIGS. 4a and 4b are views showing a cooling device of a die for plastic molding in accordance with another embodiment of the present invention. FIG. 4a shows constructional features of the cooling device in this embodiment. In FIG. 4a, fins 39 and 40 are respectively attached to exposure portions 32a and 33a. Each of air blowers 41 and 42 constitutes a cooling source. A cooling speed of the die is controlled by adjusting an amount of air supplied to the fins 39 and 40. The other constructions are similar to those in the above Embodiment 2 shown in FIGS. 2 and 3. Therefore, an explanation about the other constructions is omitted in the following description.

In this embodiment, the fins 39 and 40 are compulsorily cooled by the blowers 41 and 42 so that the die 27 is cooled through heat pipes 32 and 33. At this time, the amount of air supplied to the fins 39 and 40 is adjusted by electrically controlling the rotational speed of a motor for rotating each of the blowers 41 and 42. Thus, it is possible to easily adjust a cooling speed of each of the heat pipes 32 and 33 electrically. As a result, the cooling speed of the die 27 can be controlled very easily so that cooling efficiency of the die 27 can be improved.

When rotation of each of the blowers 41 and 42 is stopped at a heating time of heaters 30 and 31, it is possible to reduce heat loss of each of the heaters 30 and 31. As shown in FIG. 4b, if a peripheral portion of the fin 39 is covered with a cover 43, divergence of air from the blowers 41 and 42 is prevented so that a reduction in air speed can be prevented and cooling efficiency of the die 27 can be improved. In FIG. 4b, the cover 43 is shown only on a side of the fin 39.

Embodiment 4

Figure 7:
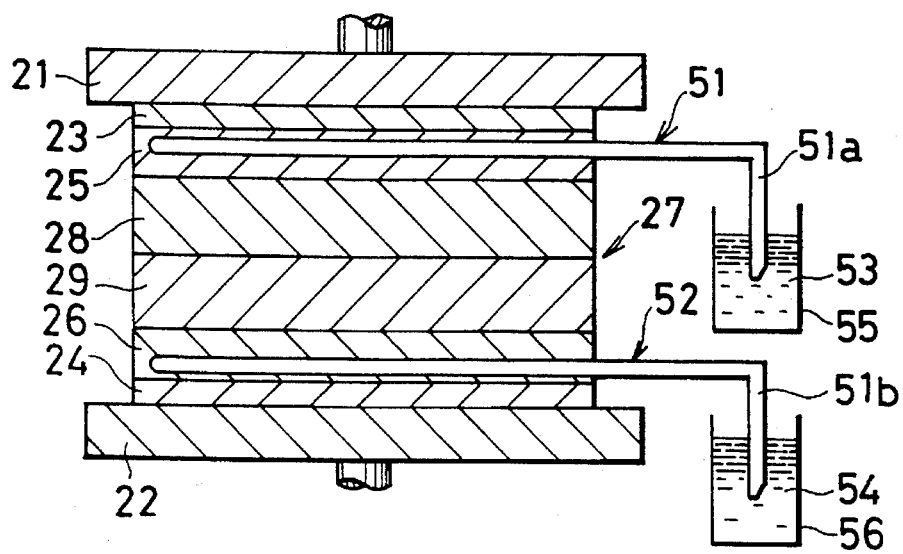
FIG. 7 is a cross-sectional view of a cooling device for cooling a die for plastic molding in accordance with another embodiment of the present invention.

FIG. 7 shows a cooling device of a die for plastic molding in accordance with another embodiment of the present invention. This cooling device has the following constructional features. Namely, end tips of exposure portions 51a and 52a of heat pipes 51 and 52 are bent downward. A cooling source is constructed by refrigerants 53 and 54 and movable bodies 55 and 56. Tip portions of the exposure portions 51a and 52a are respectively dipped into the refrigerants 53 and 54. The movable bodies 55 and 56 are respectively filled with the refrigerants 53 and 54 and can be respectively moved with respect to the exposure portions 51 and 52. Dipping amounts of the refrigerants 53 and 54 with respect to the exposure portions 51a and 52a are respectively adjusted by moving the movable bodies 55 and 56 with respect to the exposure portions 51a and 52a so that a cooling speed of the die 27 is controlled. The other constructions in this embodiment are similar to those in the above Embodiment 2. Accordingly, an explanation about the other constructions is omitted in the following description.

In this embodiment, the movable bodies 55 and 56 are moved downward in FIG. 7 at a cooling time of the die so that the dipping amounts of the refrigerants 53 and 54 with respect to the exposure portions 51a and 52a are reduced, thereby reducing cooling speeds of the heat pipes 51 and 52. In contrast to this, when the movable bodies 55 and 56 are moved upward in FIG. 7, the dipping amounts of the refrigerants 53 and 54 with respect to the exposure portions 51a and 52a are increased so that the cooling speeds of the heat pipes 51 and 52 are increased. Thus, the cooling speed of the die 27 is adjusted. As a result, the cooling speed of the die 27 can be controlled very easily so that cooling efficiency of the die 27 can be improved.

When the die 27 is heated by heaters 30 and 31, heat loss of each of the heaters 30 and 31 can be reduced if no exposure portions 51 and 52 are respectively dipped into the refrigerants 53 and 54.

Embodiment 5

Figure 8:
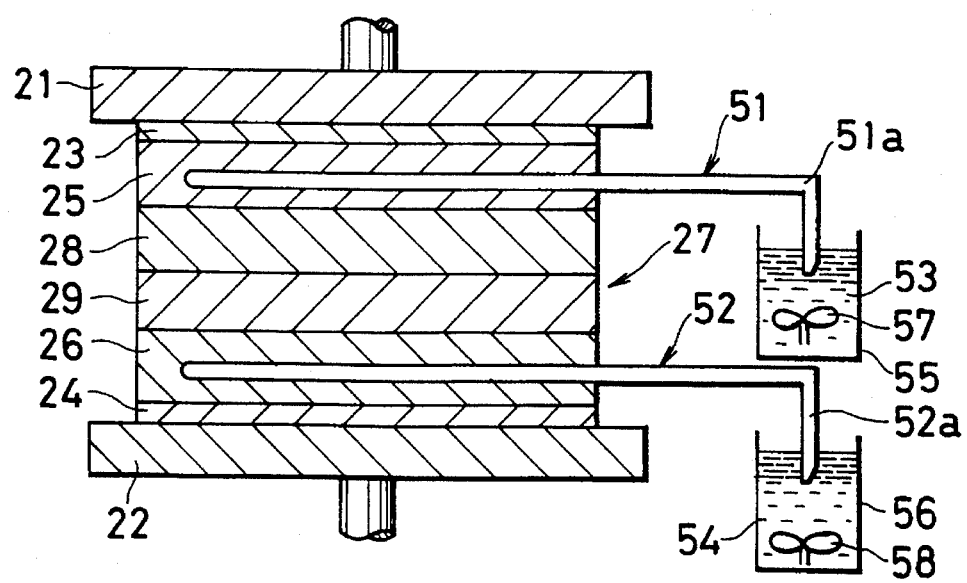
FIG. 8 is a cross-sectional view of a cooling device for cooling a die for plastic molding in accordance with another embodiment of the present invention.

FIG. 8 is a view showing a cooling device of a die for plastic molding in accordance with another embodiment of the present invention. This cooling device has the following constructional features. Stirring members 57 and 58 are respectively arranged within the movable bodies 55 and 56 shown in FIG. 7. A cooling speed of the die 27 is controlled by adjusting stirring speeds of the stirring members 57 and 58. The other constructions in this embodiment are similar to those in the above Embodiment 4. Accordingly, an explanation about the other constructions is omitted in the following description.

In this embodiment, rotational speeds of the stirring members 57 and 58 are changed by electrically controlling the operation of a motor for rotating each of the stirring members 57 and 58. Thus, the cooling speed of the die 27 can be changed so that effects similar to those in the Embodiment 4 can be obtained.

Embodiment 6

Figure 9:
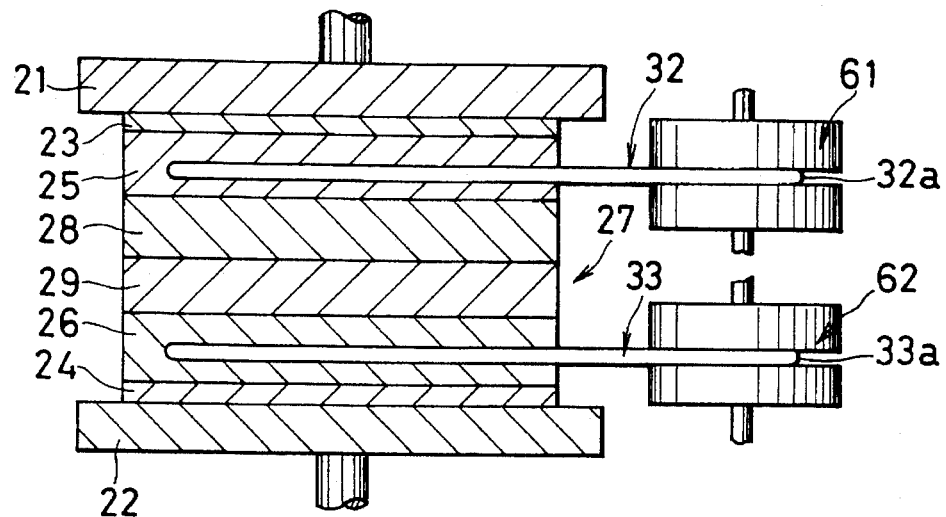
FIG. 9 is a cross-sectional view of a cooling device for cooling a die for plastic molding in accordance with another embodiment of the present invention.

FIG. 9 is a view showing a cooling device of a die for plastic molding in accordance with another embodiment of the present invention. The cooling device in this embodiment has the following constructional features. A cooling source is constructed by cooling members 61 and 62 having a large coefficient of thermal conductivity and made of copper, a copper alloy, aluminum, an aluminum alloy, etc. A cooling speed of the die 27 is controlled by adjusting contact areas of the cooling members 61 and 62 with respect to exposure portions 32a and 33a. The other constructions in this embodiment are similar to those in the above Embodiment 2. Accordingly, an explanation about the other constructions is omitted in the following description. In this Embodiment 6, similar to the Embodiments 3 to 5, the cooling speed of the die 27 can be very easily controlled so that cooling efficiency of the die 27 can be improved.

The cooling speed of the die 27 may be controlled by constructing the cooling source by a refrigerator and electrically adjusting a refrigerating temperature of this refrigerator. In this case, the cooling speed of the die 27 can be also very easily controlled so that cooling efficiency of the die 27 can be improved.

Figure 10:
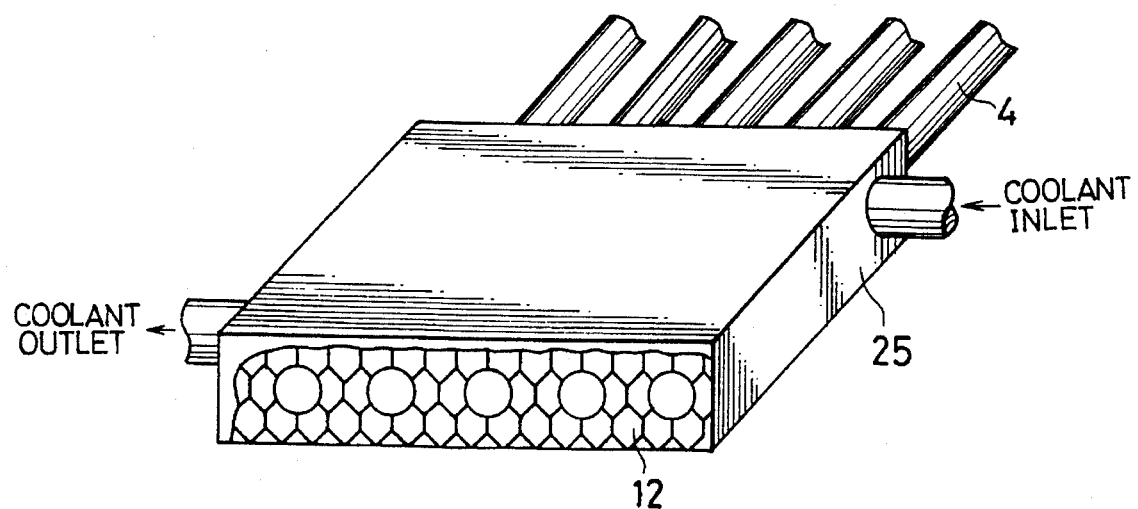
FIG. 10 is a view showing a method for cooling the aging device.

As shown in FIG. 10, a honeycomb construction 12 may be arranged within a flow passage for flowing a refrigerant through a cooling portion 25. In this case, a contact cross section of the refrigerant can be increased so that the cooling speed of the die can be increased. This construction can be also applied to a method for supplying air from the blowers 41 and 42 to the fins 39 and 40 in FIGS. 4a and 4b.

Figure 11:
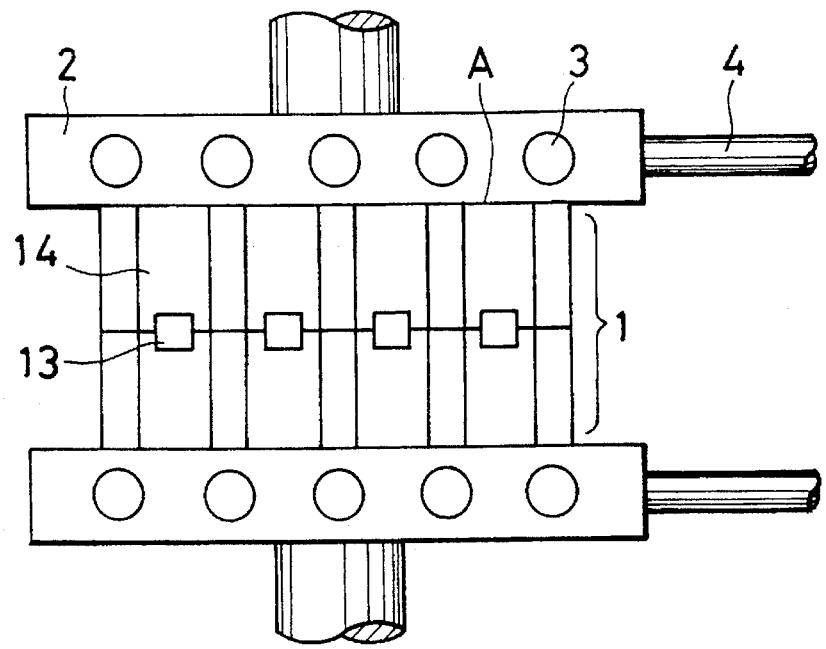
FIG. 11 is a view showing a telescopic structure of a cavity.

As shown in FIG. 11, a plurality of cavities may be constructed by a telescopic structure in which nested boxes 14 are formed by a material having a high coefficient of thermal conductivity. In this case, when molded products 13 as objects are changed, only the nested boxes 14 are replaced with another so that useless time, labor and cost are not required. A die 1 is constructed by a material having a high coefficient of thermal conductivity such as a copper alloy to rapidly and uniformly heat and cool the die 1. As shown by portion A in FIG. 11, the nested boxes come in contact with a plate having heaters 3 or heat pipes 4 so that it is not necessary to construct all the die 1 by a material having a high coefficient of thermal conductivity. Accordingly, the die 1 can be rapidly and uniformly heated and cooled by constructing only the nested boxes 14 by a material having a high coefficient of thermal conductivity. Further, it is not necessary to construct the entire die 1 by an expensive material such as a copper alloy so that manufacturing cost of the die 1 can be reduced.

Embodiment 7

Figure 12:
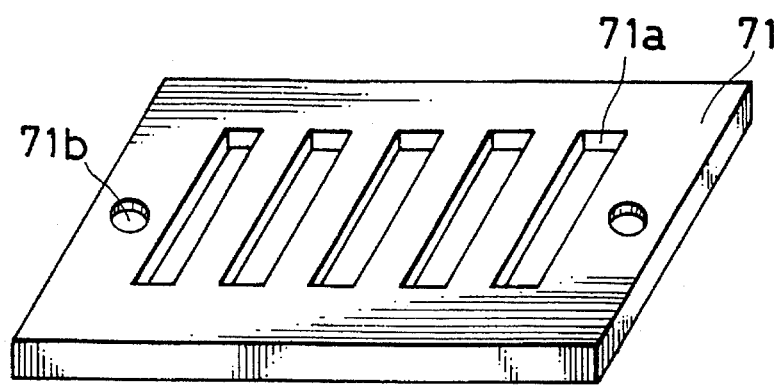
FIG. 12 is a perspective view showing the structure of a molded product conveying plate for conveying molded products in another embodiment of the present invention.

FIG. 12 is a perspective view showing the structure of a molded product conveying plate used in an aging device in accordance with another embodiment of the present invention. In FIG. 12, A molded product conveying plate 71 for conveying molded products has a molded product inserting hole 71a for inserting a plastic base material into this plate and has a positioning hole 71b for positioning this plate to an aging die. The plastic base material is inserted into the molded product inserting hole 71a of the molded product conveying plate 71. In this case, it is preferable to form a rib or step in the plastic base material such that the plastic base material is fixed to the molded product inserting hole 71a of the molded product conveying plate 71. It is not necessary to form this rib along an entire circumferential portion of the plastic base material. Accordingly, the rib may be partially Formed along the circumferential portion of the plastic base material if the plastic base material is fixed to the molded product inserting hole 71a of the molded product conveying plate 71. The positioning hole 71b of the molded product conveying plate 71 is preferably engaged with a lock pin for positioning a cavity plate and a core plate of an aging die. However, if the molded product conveying plate 71 is positioned with respect to the aging die, a positioning pin, etc. may be formed instead of the positioning hole 71b in the molded product conveying plate 71.

Each of FIGS. 13 and 14 is a view showing an aging method used in an aging device in accordance with another embodiment of the present invention. In this embodiment, a plastic base material is sequentially conveyed, inserted and taken out of an aging die as follows.

Figure 13A:
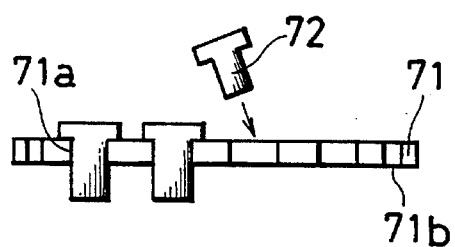
FIGS. 13a to 13c are views showing an aging method in an aging device in another embodiment of the present invention.
Figure 13B:
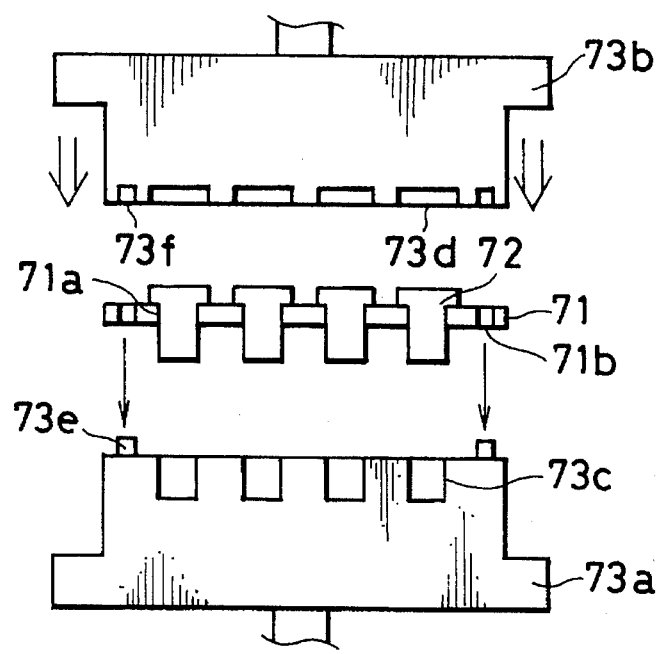
Figure 13C:
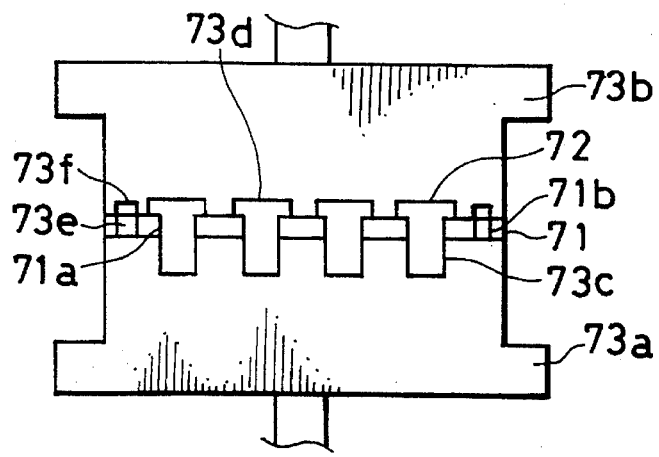

As shown in FIG. 13a, a plastic base material 72 is inserted into a molded product inserting hole 71a of a molded product conveying plate 71. Thereafter, as shown in FIGS. 13b and 13c, the molded product conveying plate 71 having the inserted plastic base material 72 is moved onto opened upper and lower aging dies 73b and 73a. The molded product conveying plate 71 and the aging dies 73a and 73b are then positioned. Simultaneously, the plastic base material 72 is inserted into each of predetermined inserting grooves 73c and 73d (as die piece portions) of the aging dies 73a and 73b. At this time, a positioning pin 73e arranged on the lower aging die 73a is inserted into an inserting hole 73f of the upper aging die 73b through a positioning hole 71b of the molded product conveying plate 71.

Figure 14A:
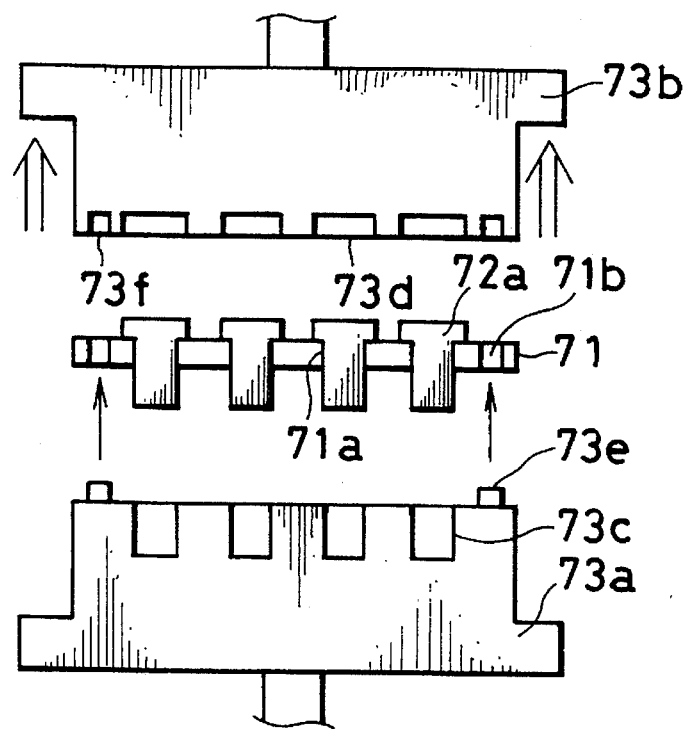
FIGS. 14a and 14b are views showing an aging method in an aging device in another embodiment of the present invention.
Figure 14B:
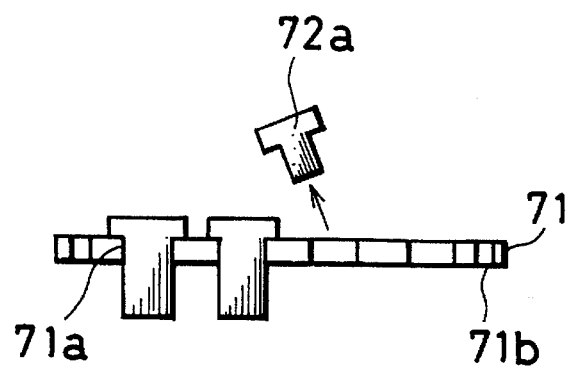

Next, as shown in FIG. 13c, the molded product conveying plate 71 is clamped by the aging dies 73a and 73b therebetween. In this state, the aging dies are heated and cooled in an aging process. At this time, the molded product conveying plate 71 constitutes a portion of the aging dies in these heating and cooling processes. After the aging dies are heated and cooled, the aging dies 73a and 73b are opened as shown in FIG. 14a. Thus, the molded product conveying plate 71 is raised upward while the molded product conveying plate 71 supports a plurality of plastic molded products 72a. At this time, the plural plastic molded products 72a are simultaneously taken out of the aging dies in a state in which the plastic molded products 72a are supported by the molded product conveying plate 71. Then, as shown in FIG. 14b, the molded product conveying plate 71 is conveyed outside the aging dies 73a and 73b so that the plastic molded products 72a are taken out of the molded product conveying plate 71.

In this embodiment, each of plural plastic base materials 72 is arranged within the molded product inserting hole 71a of the molded product conveying plate 71. Thereafter, the molded product conveying plate 71 is moved and positioned such that the plastic base materials 72 are located on the inserting grooves 73c, 73d (as die piece portions) of the opened aging dies 73a, 73b. Simultaneously, the plural plastic base materials 72 can be inserted into the inserting grooves 73c, 73d (as die piece portions) of the aging dies 73a, 73b. Therefore, it is possible to reduce a cyclic time of the aging process.

Figure 15:
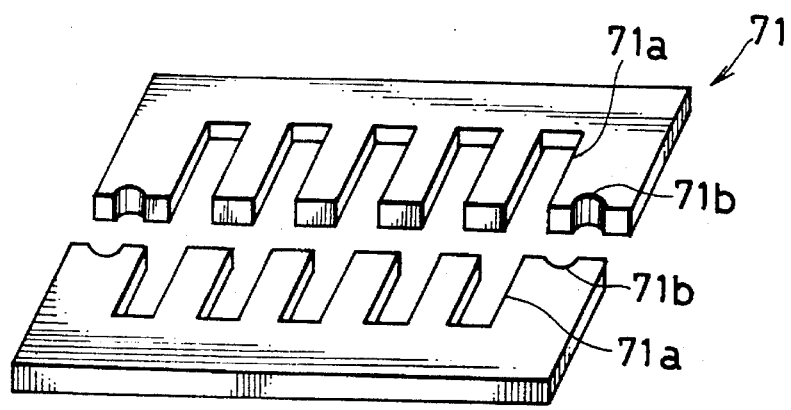
FIG. 15 is a view showing a case in which the molded product conveying plate applicable to the present invention is divided.

In the above embodiment, no molded product conveying plate 71 is divided, but the present invention is not limited to this undivided case. For example, as shown in FIG. 15, the molded product conveying plate 71 may be divided into two divisional portions at centers of the molded product inserting hole 71a and the positioning hole 71b. In this case, molded products can be smoothly taken out of the divided molded product conveying plate 71 in comparison with a case in which the undivided molded product conveying plate 71 is used.

In the above embodiment, the plural plastic base materials 72 are inserted into the aging dies 73a and 73b. After the aging process is completed, the molded products 72a are taken out of the aging dies 73a and 73b. These inserting and taking-out operations are separately performed. However, the present invention is not limited to this separating case. Namely, the plural plastic base materials 72 is inserted into the aging dies 73a and 73b and the molded products 72a may be simultaneously taken out of the aging dies 73a and 73b after the aging process is completed. In this case, a cyclic time of the aging process can be reduced in comparison with the above separating case in which no inserting and taking-out operations can be simultaneously per formed.

In the above embodiment, the single molded product conveying plate 71 is arranged, but the present invention is not limited to the single molded product conveying plate. For example, two molded product conveying plates or more may be arranged. In this case, as shown in FIG. 13c, a plastic base material 72 is simultaneously inserted into another molded product conveying plate 71 in heating and cooling processes of a die. The plastic base material 72 can be heated, cooled and taken out of this molded product conveying plate 71 as molded products 72a. Accordingly, an entire cyclic time of the aging process can be reduced.

Embodiment 8

Figure 16:
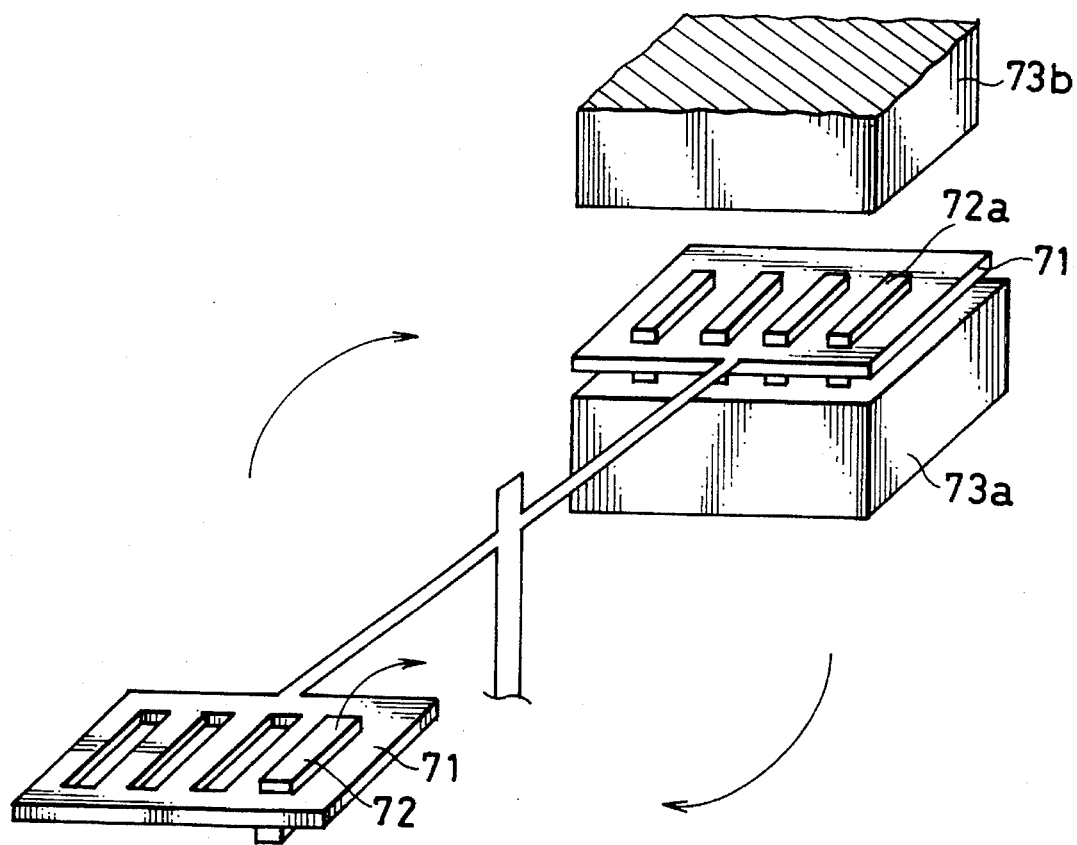
FIG. 16 is a view showing a case in which two molded product conveying plates applicable to the present invention are arranged.

FIG. 16 shows a concrete example in which a plurality of molded product conveying plates 71 are prepared and arranged. In FIG. 16, two molded product conveying plates 71 are arranged. Each of the two molded product conveying plates 71 is symmetrically located around a central axis. While one molded product conveying plate 71 is heated and cooled, a plastic base material 72 is inserted into the other molded product conveying plate 71. After the one molded product conveying plate 71 is completely heated and cooled, the two molded product conveying plates 71 are rotated. Next, the other molded product conveying plate 71 having the inserted plastic base material 72 is heated and cooled. In the meanwhile, molded products 72a are taken out of the heated and cooled one molded product conveying plate 71 and a plastic base material is inserted into this one molded product conveying plate 71. Thus, heating and cooling of the plastic base material, and inserting and taking-out operations of the molded products 72a constituting two processes are alternately performed by using the two molded product conveying plates 71. Accordingly, a cyclic time of the aging process can be efficiently reduced.

Figure 17:
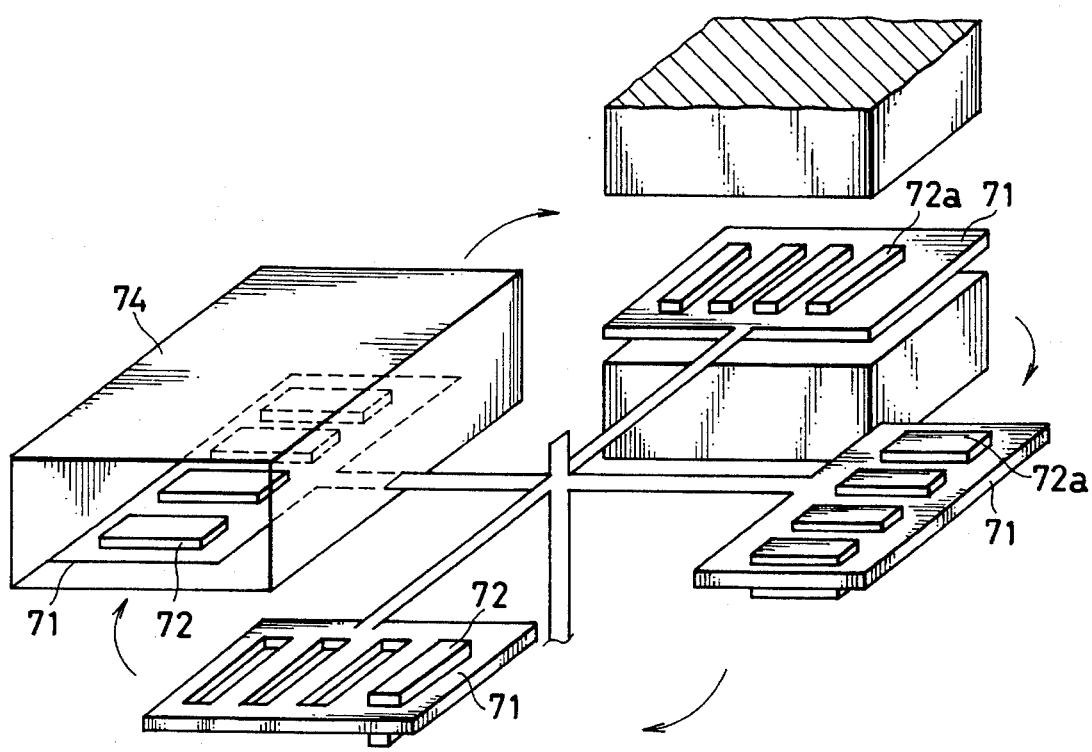
FIG. 17 is a view showing the case of a heat insulating station for holding temperatures of a plastic base material and the molded product conveying plate applicable to the present invention.

In the present invention, as shown in FIG. 17, a heat insulating station 74 for holding temperatures of a plastic base material 72 and a molded product conveying plate 71 in advance may be arranged before heating and cooling processes of aging. In this case, if the plastic base material 72 and the molded product conveying plate 71 are heated and held until temperatures of aging dies 73a and 73b. heating times of the plastic base material 72 and the molded product conveying plate 71 can be reduced in comparison with a case in which the plastic base material 72 and the molded product conveying plate 71 are not heated and held until the temperatures of the aging dies 73a and 73b. Accordingly, a molding cyclic time can be reduced. In this case, a heat insulating process is required in addition to the heating and cooling processes and the inserting and taking-out processes of molded products with respect to the molded product conveying plate 71. Accordingly, it is preferable to arrange three molded product conveying plates 71 or more as shown in FIG. 17.

In the present invention, each of the molded product conveying plates 71 may be constructed by the same material as the aging dies 73a and 73b. Otherwise, each of the molded product conveying plates 71 may be constructed by a material having a coefficient of thermal conductivity equal to that of the aging dies 73a and 73b. In this case, no temperature distribution of each of the aging dies 73a and 73b is easily formed irregularly in the heating and cooling processes in comparison with a case in which each of the molded product conveying plates 71 is not constructed by each of the above two materials. Accordingly, the aging dies 73a and 73b can be uniformly heated and cooled.

Embodiment 9

Figure 18:
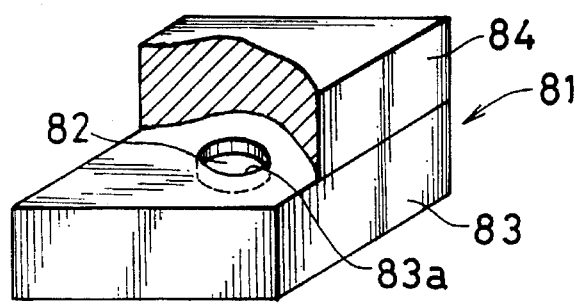
FIG. 18 is a view showing the construction of an aging die for achieving a manufacturing method of a molded product in accordance with another embodiment of the present invention.

Each of FIGS. 18 to 20 is a view showing a manufacturing method of a molded product in accordance with another embodiment of the present invention.

In FIGS. 18 and 19, an aging die 81 has an upper die 83 and a lower die 84 respectively having recessed portions 83a and 84a. The recessed portions 83a and 84a have mirror surfaces and constitute a cavity 82 when the die 81 is clamped. A blank 85 is made of polycarbonate (which is simply called PC in the following description) as thermoplastic resin manufactured in an injecting process. A blank 86 is made of polymethyl methacrylate (which is simply called PMMA in the following description) as thermoplastic resin manufactured in an injection molding process. Polycarbonate (PC) has a glass transition temperature of 140° C. and polymethyl methacrylate (PMMA) has a glass transition temperature of 100° C.

In this embodiment, polycarbonate (PC) is heated to a temperature equal to or higher than a fluidizable temperature of this resin in advance in the injecting process. Thus, this polycarbonate (PC) is injection-molded into a die for injection molding held at a temperature equal to or lower than a thermal deforming temperature of polycarbonate (PC). Then, a gate seal is formed and a blank 85 is thus manufactured. Further, polymethyl methacrylate (PMMA) is heated to a temperature equal to or higher than a fluidizable temperature of this resin. This polymethyl methacrylate (PMMA) is then injection-molded into a die for injection molding held at a temperature equal to or lower than a thermal deforming temperature of polymethyl methacrylate (PMMA). Then, a gate seal is formed and a blank 86 is thus manufactured. The blanks 85 and 86 have sizes designed such that the blanks 85 and 86 can be easily inserted into the cavity 82 in advance in a combinational state of the cavity 82 of the aging die 81.

Figure 19A:
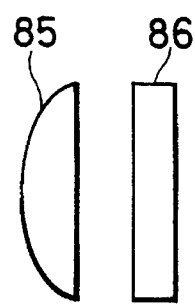
FIGS. 19a to 19c are views showing an aging process in the manufacturing method in this embodiment of FIG. 18.
Figure 19B:
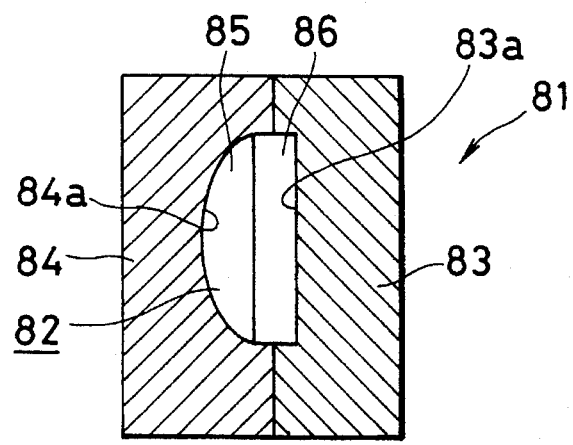

As shown in FIGS. 19a and 19b, these blanks 85 and 86 are inserted into the aging die 81 held at a temperature such as about 170° C. equal to or higher than that of polymethyl methacrylate (PMMA) having a low glass transition temperature. Thereafter, the cavity 82 of this die 81 is set to be in a vacuum state.

Figure 19C:
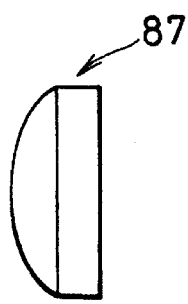

Next, the blanks 85 and 86 are melted at a temperature of 170° C. and are held for three minutes. Thereafter, the blanks 85 and 86 are gradually cooled to a temperature such as about 90° C. lower than the temperature of polymethyl methacrylate (PMMA) at a rate of 1° C. per minute. Thus, internal distortion, residual stress and molecular orientation are removed from the blanks 85 and 86. This temperature such as about 90° C. is lower than the thermal deforming temperature of polymethyl methacrylate (PMMA). Thereafter, as shown in FIG. 19c, when the blanks 85 and 86 are taken out of the cavity 82, an integral hybrid molded product 87 can be obtained.

In this embodiment, the blanks 85 and 86 formed by different materials are combined with each other. The combined blanks 85 and 86 are inserted into the aging die 81 held at a temperature equal to or higher than a glass transition temperature with respect to each of these materials. Thereafter, the blanks 85 and 86 are held for a predetermined time at the temperature equal to or higher than the glass transition temperature of resin. Further, the blanks 85 and 86 are gradually cooled to a temperature equal to or lower than a thermal deforming temperature with respect to each of the materials. Therefore, an integral molded product 87 can be manufactured with high accuracy by melting and joining the blanks 85 and 86 with each other. Further, it is possible to obtain a molded product usefully using characteristics of polycarbonate (PC) and polymethyl methacrylate (PMMA). Furthermore, a degree of freedom in design of the molded product 87 can be increased.

Since polycarbonate (PC) and polymethyl methacrylate (PMMA) are constructed by thermoplastic resin, the blanks 85 and 86 can be easily integrated with each other in a melting state of resin. Further, mirror faces can be easily transferred to the blanks 85 and 86.

An aging temperature of the aging die 81 is set to be equal to or higher than the glass transition temperature of polymethyl methacrylate (PMMA) lower than that of polycarbonate (PC). Accordingly, the blanks 85 and 86 can be rapidly melted and integrated with each other so that an aging time can be reduced.

A taking-out temperature of the molded product 87 after aging of the aging die 81 is set to be equal to or lower than the glass transition temperature of polymethyl methacrylate (PMMA) lower than that of polycarbonate (PC). Accordingly, after different materials of the molded product 87 are cooled and reliably integrated with each other, the molded product 87 can be taken out of the aging die 87 so that a quality of the molded product 87 can be improved.

The cavity 82 of the aging die 81 is held in a vacuum state at an aging time. Therefore, it is possible to prevent air bubbles from being mixed and flowed to a central portion of joining faces of the blanks 85 and 86 in an aging process. Accordingly, it is possible to prevent air bubbles from being mixed and flowed into a central portion of the molded product 87 obtained by integrating the blanks 85 and 86 with each other. As a result, a quality of the molded product 87 can be improved.

In this embodiment, two kinds of blank materials are combined with each other, but the present invention is not limited to this case. For example, three or more kinds of blank materials can be combined with each other.

Figure 20A:
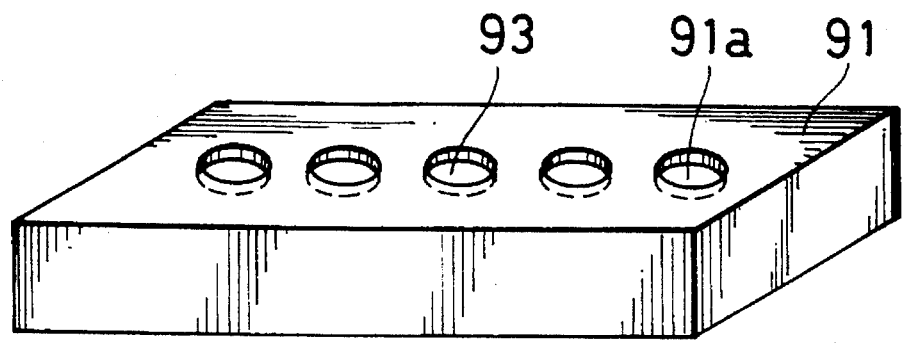
FIGS. 20a and 20b are views showing another example of the aging die shown in FIG. 18.
Figure 20B:
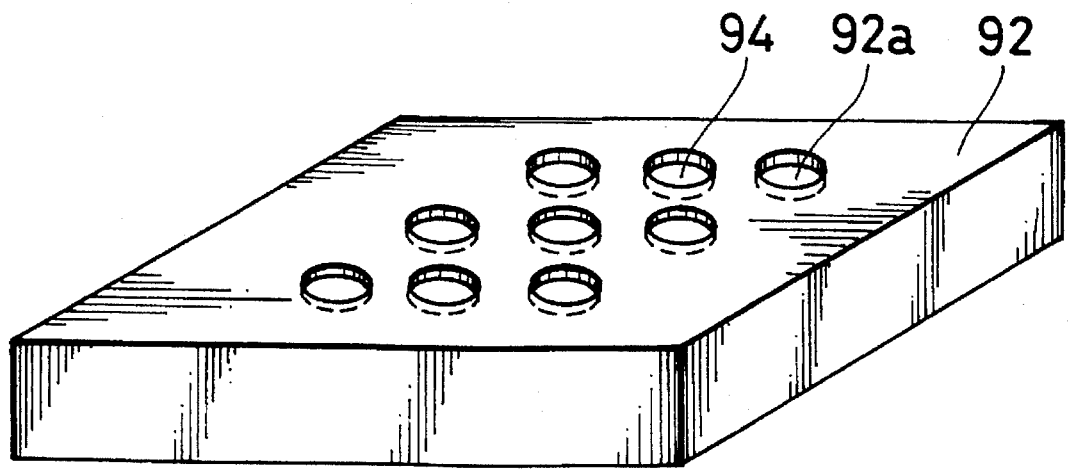

The aging die 81 has the single cavity 82. However, many recessed portions 91a and 92a respectively constituting cavities 93 and 94 may be formed as shown in FIGS. 20a and 20b illustrating only lower dies 91 and 92. In this case, many blank materials can be integrated with each other at one time by aging so that productivity of hybrid molded products can be greatly improved.

Embodiment 10

A method for integrating a blank made of polycarbonate (PC) with a blank made of glass and prepared in advance will next be described as another embodiment of the present invention.

In this embodiment, this integrating method will be explained by using the aging die 81 in the above Embodiment 9. A blank made of polycarbonate (PC) and a blank made of glass and prepared in advance are inserted into the aging die 81. Thereafter, the cavity 82 of the aging die 81 is set to be in a vacuum state.

Next, the blanks of polycarbonate (PC) and glass are melted at a temperature of 170° C. and are held for three minutes. Thereafter, the blanks are cooled to a temperature such as 130° C. lower than the temperature of polycarbonate (PC) at a rate of 1° C. per minute. Thus, internal distortion, residual stress and molecular orientation are removed from the blank of polycarbonate (PC). This temperature such as 130° C. is equal to or lower than a thermal deforming temperature of polycarbonate (PC). Thereafter, when the blanks of polycarbonate (PC) and glass are taken out of the cavity 82, an integral hybrid molded product can be obtained.

Embodiment 11

A method for integrating a metallic inserting material manufactured by a press machine with a blank made of polycarbonate (PC) including glass fibers will next be described as another embodiment of the present invention.

In this embodiment, the integrating method will be explained by using the aging die 81 in the Embodiment 9. A metallic inserting material and a polycarbonate (PC) blank including glass fibers are inserted into the aging die 81. Thereafter, the cavity 82 of the aging die 81 is set to be in a vacuum state.

Next, the metallic inserting material and the polycarbonate (PC) blank are melted at a temperature of 170° C. and are held for three minutes. Thereafter, the metallic inserting material and the polycarbonate (PC) blank are cooled to a temperature such as 130° C. lower than the temperature of polycarbonate (PC) at a rate of 1° C. per minute. Thus, internal distortion, residual stress and molecular orientation are removed from the blank of polycarbonate (PC). This temperature such as 130° C. is equal to or lower than a thermal deforming temperature of polycarbonate (PC). Thereafter, when the metallic inserting material and the polycarbonate (PC) blank are taken out of the cavity 82, an integral hybrid molded product can be obtained.

Embodiment 12

A manufacturing method of a plastic molded product in another embodiment of the present invention will next be described with reference to FIGS. 21 to 24.

Figure 21A:
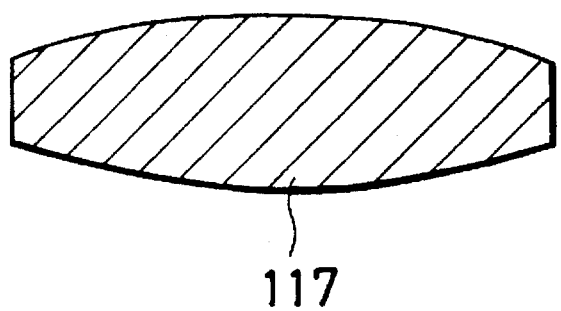
FIG. 21a is a view showing the construction of a molded product molded by a manufacturing method of a plastic molded product in another embodiment of the present invention.
Figure 21B:
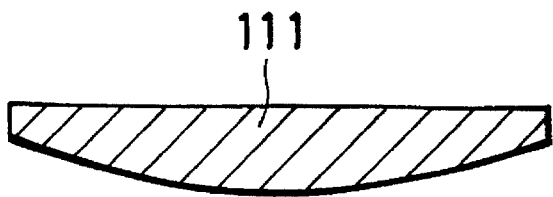
FIG. 21b is a view showing the construction of a resin base material divided by injection molding and approximately preprocessed in a final shape.

The features of the present invention in this embodiment are shown in FIGS. 21a and 21b. Namely, when a large-sized lens, etc. are manufactured as shown in FIG. 21a, large force for clamping a die is required in injecting and filling processes of resin. Accordingly, as shown in FIG. 21b, two small resin base materials are preprocessed by injection molding in advance and are joined with each other in an aging process.

Figure 22:
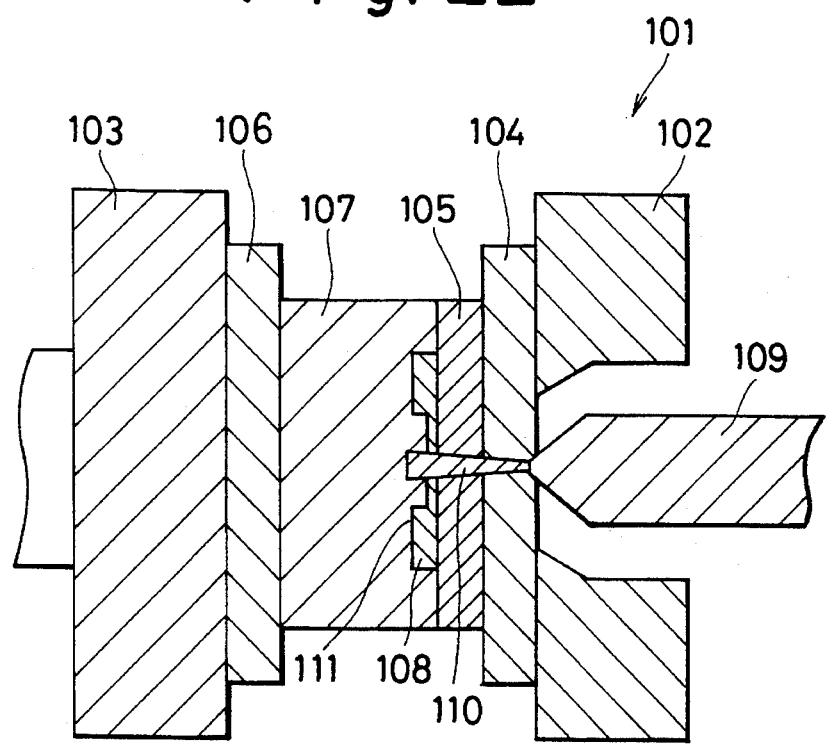
FIG. 22 is a cross-sectional view of an injection molding machine in the embodiment of FIGS. 21a and 21b.

The construction of an injection molding machine for executing the manufacturing method in this embodiment will next be described. FIG. 22 shows this injection molding machine. In FIG. 22, the injection molding machine 101 has a fixed side platen 102 and a movable side platen 103. Fixing side dies 104, 105 for injection molding and movable side dies 106, 107 are respectively attached to these platens 102 and 103. Temperatures of these dies 104 to 107 are set such that the temperature of a cavity 108 is equal to or lower than a thermal deforming temperature of resin. Melted resin 11 is injected into this cavity 108 through a sprue runner 110 from an injecting cylinder 109 so that the cavity 108 is filled with the melted resin.

After these injecting and filling operations, a gate portion of the sprue runner 110 is cooled and solidified. When a resin temperature is finally equal to or lower than the thermal deforming temperature, a resin base material 111 approximately preprocessed in a final shape is taken out as shown in FIG. 21b by opening the fixed side dies 104 and 105 and the movable side dies 106 and 107.

Figure 23:
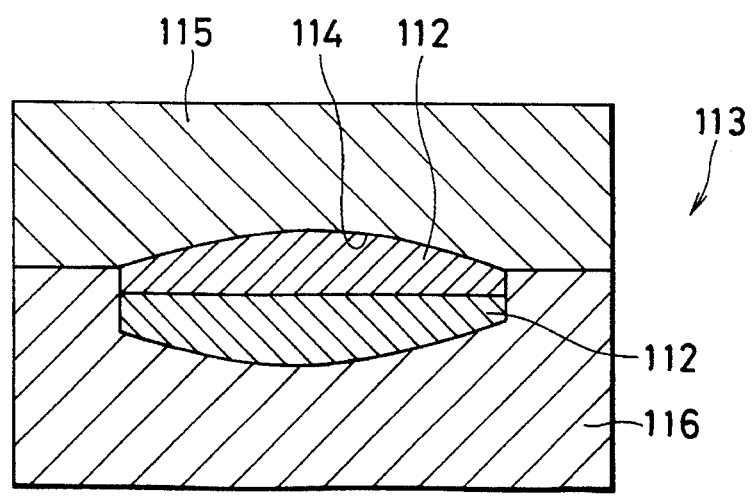

In FIG. 23, an aging die 113 has an upper die 115 and a lower die 116 definitely forming a cavity 114 on contact die faces opposite to each other.

An operation of the injection molding machine will next be described.

Two resin base materials 112 approximately preprocessed in a final shape are separately injection-molded by the injection molding machine 101. The resin base materials 112 are inserted and laminated with each other within the same cavity 114 of the aging die 113. The resin base materials 112 are then held for a predetermined time at a temperature equal to or higher than a glass transition temperature of this resin. Thereafter, the resin base materials 112 are gradually cooled to a temperature equal to or lower than a thermal deforming temperature of this resin. As a result, the two resin base materials 112 are melted and joined with each other. Thus, an integral molded product 117 is manufactured as shown in FIG. 21a.

In this embodiment, the two resin base materials 112 preprocessed by injection molding are inserted and aged within the same cavity 114 of the aging die 113. Thus, the two resin base materials 112 are melted and joined with each other so that the integral molded product 117 is manufactured. Accordingly, a resin base material 112 approximately preprocessed in a final shape by injection molding is divided into two divisional portions or more. Namely, a molding operation can be divisionally performed twice. Therefore, it is possible to reduce force for clamping the die at each of injection-molding times. Accordingly, a large-sized long molded product can be easily manufactured by the compact molding machine 101 so that manufacturing cost of the molded product can be reduced.

Figure 24A:
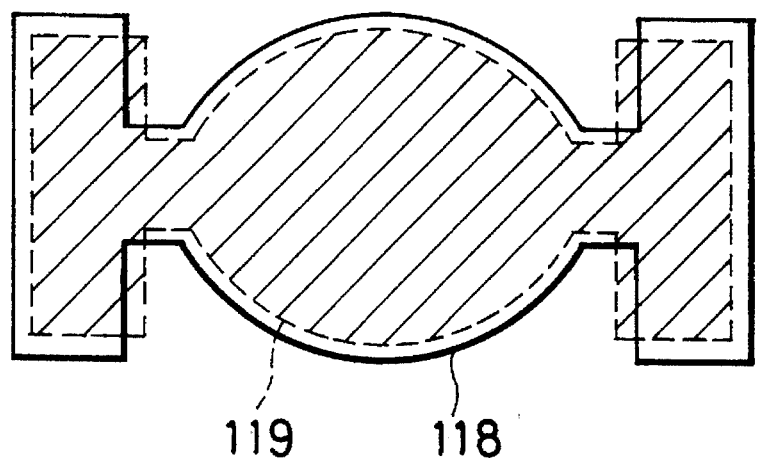
FIG. 24a is a view showing a state in which a base material having a complicated shape is thermally shrunk so that no base material can be easily inserted into an aging die.
Figure 24B:
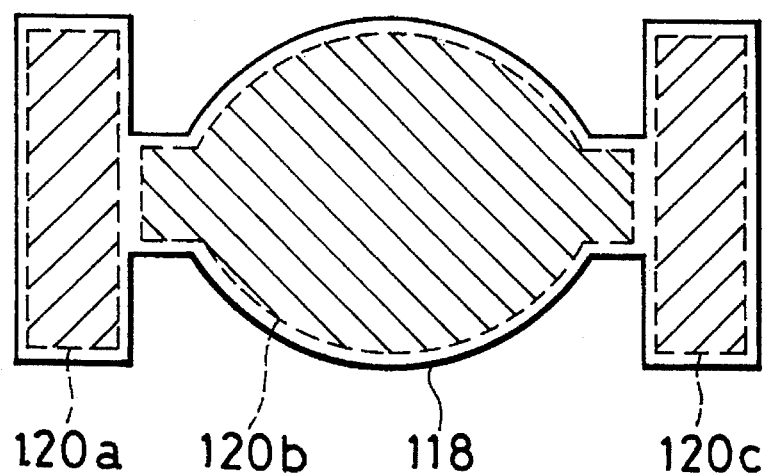
FIG. 24b is a view showing a state in which the base material is divided and inserted into the aging die.

In this embodiment, the two resin base materials 112 are aged. However, three resin base materials or more may be aged as shown in FIGS. 24a and 24b. A base material 119 shown in FIG. 24a is formed in a complicated shape having ribs on both sides of a cavity 118. When this base material 119 is inserted into the die, there is a case in which no base material 119 can be inserted into the cavity 118 by thermal shrinkage in an injecting process. However, when the base material is divided into three divisional portions of ribs 120a and 120c and a body 120b as shown in FIG. 24b, the base material can be easily inserted into the cavity 118.

Embodiment 13

Figure 25:
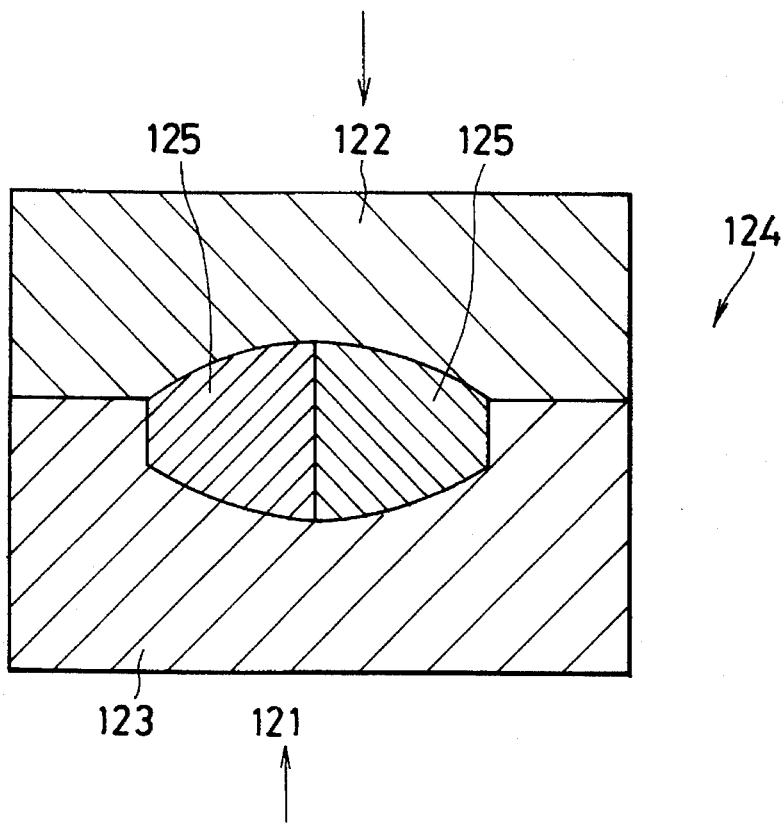
FIG. 25 is a cross-sectional view of an aging die for achieving a manufacturing method of a plastic molded product in another embodiment of the present invention.
Figure 26:
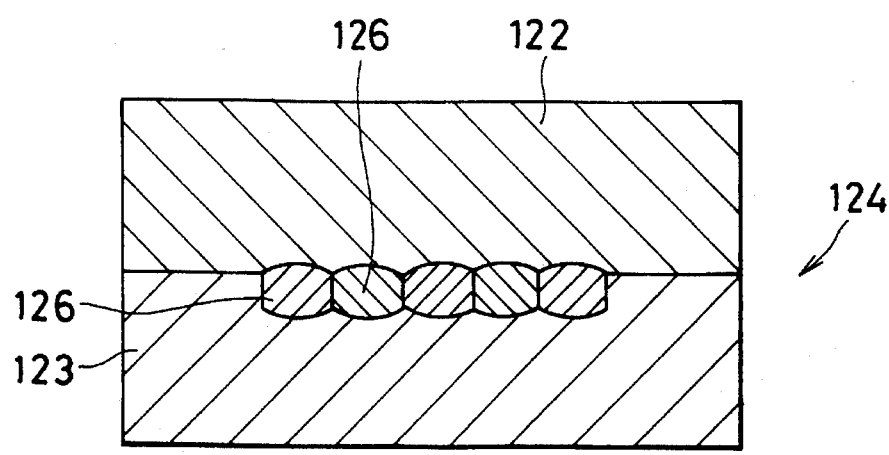
FIG. 26 is a cross-sectional view showing another example of the aging die shown in FIG. 25.
Figure 27:
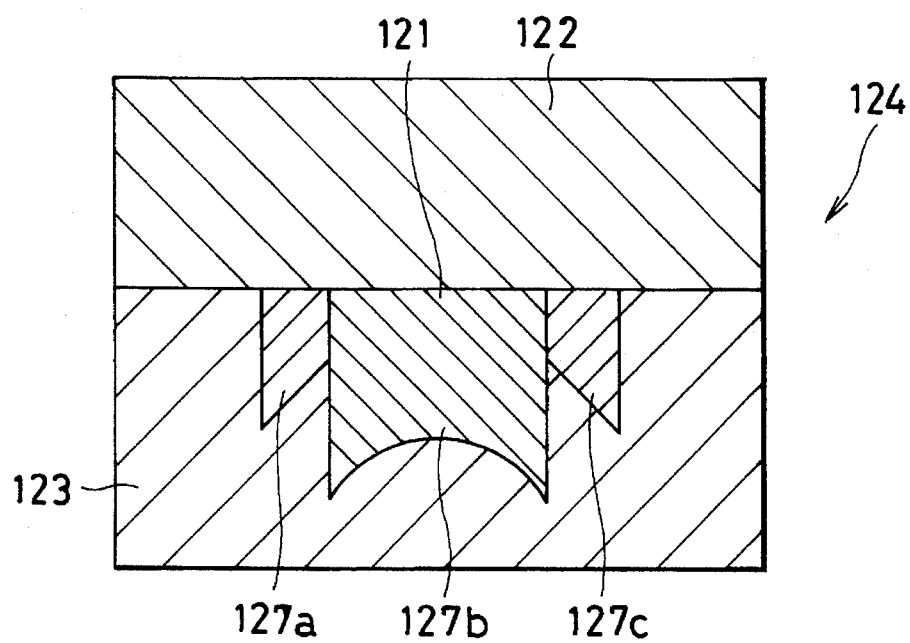
FIG. 27 is a cross-sectional view showing another example of the aging die shown in FIG. 25.

Each of FIGS. 25 to 27 shows a manufacturing method of a plastic molded product in accordance with another embodiment of the present invention.

In FIG. 25, an aging die 124 is constructed by an upper die 122 and a lower die 123 forming a cavity 121 on contact die faces opposite to each other. Two resin base materials 125 are joined with each other within the cavity 121 of the die 124 such that each of joining faces of the two resin base materials 125 is equal to a direction not parallel to a parting face of the die 124, i.e., the same direction as a die clamping direction shown by an arrow in FIG. 25. The two resin base materials 125 are aged in this state.

Accordingly, a divisional direction of the resin base materials 125 approximately preprocessed in a final shape can be set to be in conformity with the clamping direction of the aging die 124. Therefore, die clamping force can be further reduced at an injection molding time. When this manufacturing method is used, a plurality of resin base materials 126 can be molded by injection molding as shown in FIG. 26. A group of lenses can be easily manufactured by joining and aging the plural resin base materials 126.

When a molded product having a complicated shape is manufactured, the resin base material is divided into a plurality of resin base materials such as three resin base materials 127a to 127c in the same direction as a clamping direction of the die 124 as shown in FIG. 27. In this case, the resin base materials 127a to 127c can be easily inserted into the cavity 121.

When a base material having a complicated shape is formed in an injecting process, an irregular density distribution of the base material tends to be caused. Density of the base material can be uniformed to a certain extent even when the base material having such a density distribution is aged. However, there is a limit in uniform density of the base material. Therefore, if the base material is divided as in this embodiment to provide a uniform density and is aged, it is possible to obtain a molded product having a final shape providing a uniform density distribution. Further, it is possible to prevent a die cavity from being insufficiently filled with resin at the time of an injection molding process for providing the complicated shape of the base material.

Embodiment 14

Figure 28:
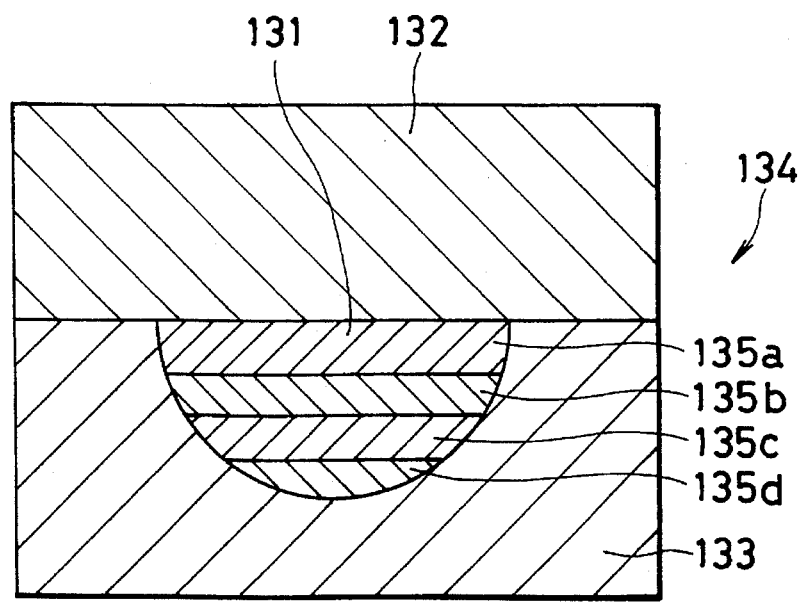
FIG. 28 is a cross-sectional view of an aging die in the embodiment of FIGS. 21a and 21b.

FIG. 28 is a view showing a manufacturing method of a plastic molded product in accordance with another embodiment of the present invention.

In FIG. 28, an aging die 134 is constructed by an upper die 132 and a lower die 133 forming a cavity 131 on contact die faces opposed to each other. A plurality of resin base materials 135a to 135d are injection-molded into this cavity 131 of the die 134 such that thicknesses of the resin base materials are uniformed. In this embodiment, a molded product having different thicknesses can be easily manufactured by such a manufacturing method without causing contraction although this contraction tends to be especially caused with respect to such a molded product.

Figure 29A:
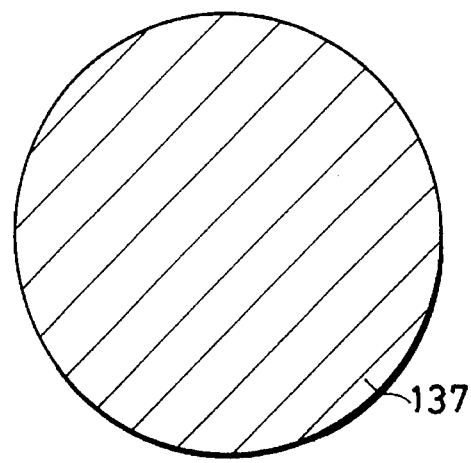
FIG. 29a is a view showing a molded product having a large area.
Figure 29B:
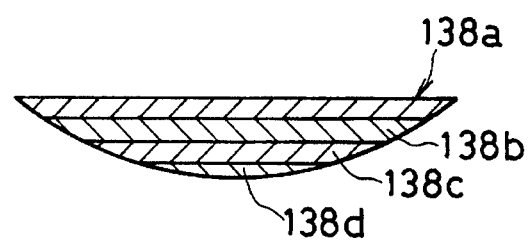
FIG. 29b is a view showing a molded product which is small in cross section.
Figure 29C:
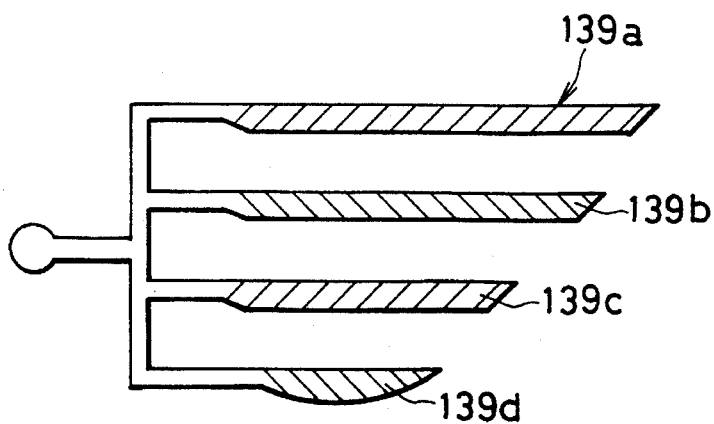
FIG. 29c is a view showing many base materials molded in an injecting process.

When a molded product 137 having a large area is formed as shown in FIG. 29a, the resin base material is divided into a plurality of base materials 138a to 138d as shown in FIG. 29b. The base materials 138a to 138d are then molded. In this case, a cross section of the molded product can be reduced as shown in FIG. 29b by changing a die clamping direction in formation of the molded product in an injecting process and changing die clamping force, in aging of this molded product. Therefore, the clamping force of the aging die can be reduced. Therefore, many base materials 139a to 139d can be taken out of the aging die in the injecting process as shown in FIG. 29c.

Embodiment 15

Figure 30A:
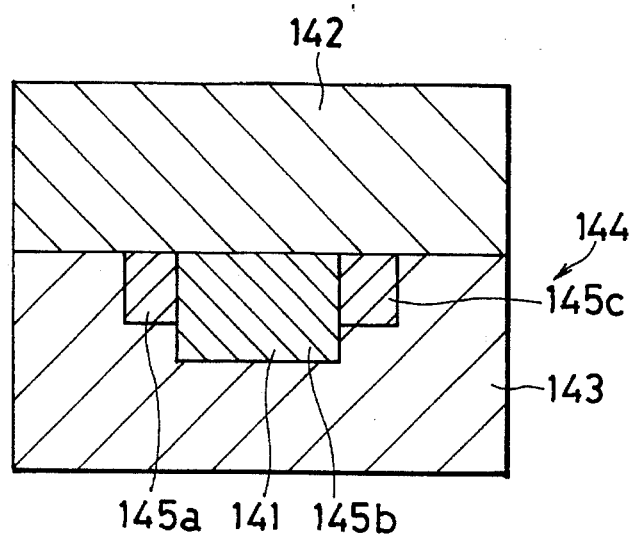
FIGS. 30a and 30b are cross-sectional views of an aging die for achieving a manufacturing method of a plastic molded product in another embodiment of the present invention.
Figure 30B:
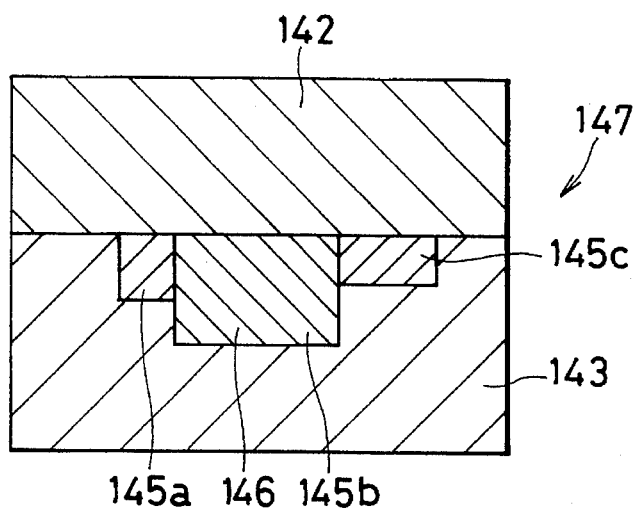

Each of FIGS. 30a and 30b is a view showing a manufacturing method of a plastic molded product in accordance with another embodiment of the present invention.

In FIG. 30a, an aging die 144 is constructed by an upper die 142 and a lower die 143 forming a cavity 141 on contact die faces opposed to each other. A plurality of resin base materials 145a to 145c are inserted into this cavity 141 of the die 144.

An aging die 147 shown in FIG. 30b has a cavity 146 having a shape different from that of the above cavity 141 shown in FIG. 30a. Concretely, a resin base material 145c is molded such that a portion of the cavity 146 for receiving the resin base material 145c is wider and shallower than a corresponding portion of the cavity 141.

Namely, in this embodiment, the three resin base materials 145a to 145c can be freely replaced with another in predetermined positions of the cavities 141 and 146. Various kinds of molded products can be manufactured by changing injecting positions of the resin base materials 145a to 145c in accordance with shapes of the cavities 141 and 146.

Embodiment 16

Figure 31:
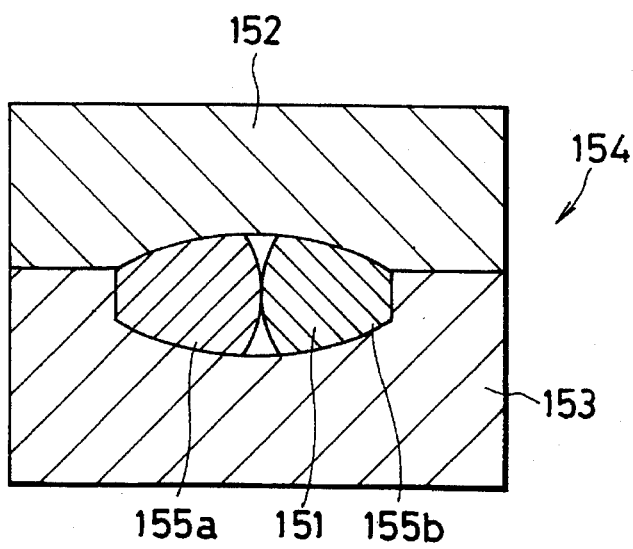
FIG. 31 is a cross-sectional view of an aging die for achieving a manufacturing method of a plastic molded product in another embodiment of the present invention.
Figure 32:
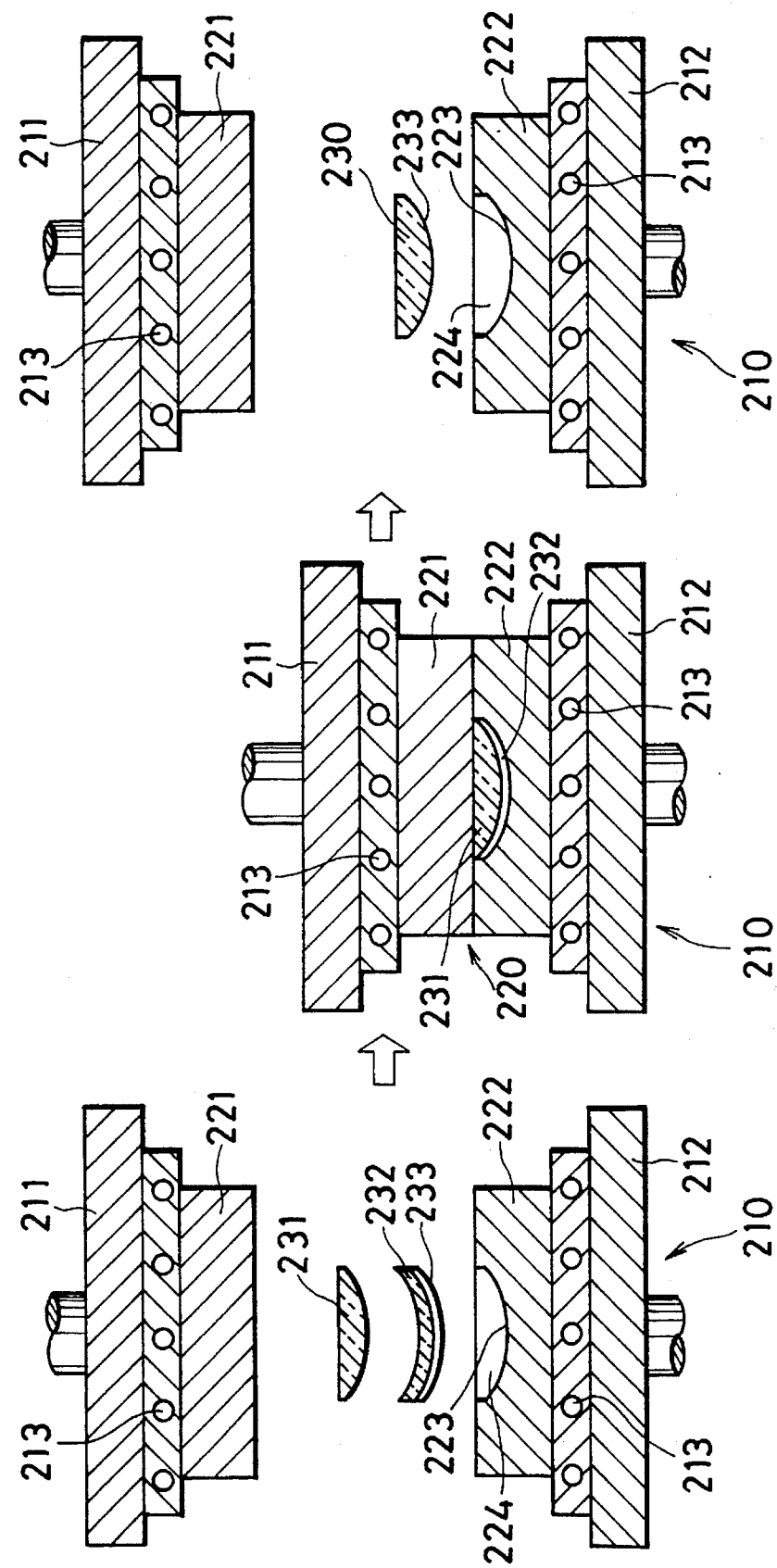
FIG. 32 is a sectional side view showing a main portion of a manufacturing apparatus of a plastic mirror for executing a plastic mirror manufacturing method in accordance with another embodiment of the present invention.

FIG. 31 is a view showing a manufacturing method of a plastic molded product in accordance with another embodiment of the present invention.

In FIG. 31, an aging die 154 is constructed by an upper die 152 and a lower die 153 forming a cavity 151 on contact die faces opposed to each other. Two resin base materials 155a and 155b approximately preprocessed in a final shape in advance by injection molding are inserted into the cavity 151 of the die 154.

The resin base materials 155a and 155b are molded in advance by injection molding such that opposite joining faces of the resin base materials 155a and 155b are formed in a convex shape. These convex face portions are joined with each other and the resin base materials 155a and 155b are then inserted into the cavity 151. Accordingly, it is possible to prevent air bubbles from being mixed and flowed to a central portion of the joining faces of the resin base materials 155a and 155b in an aging process. When the joining faces of the resin base materials 155a and 155b inserted into the cavity 151 of the aging die 154 are planar, air bubbles tend to be mixed and flowed to the central portion of the joining faces. Accordingly, when this central portion is formed in a convex shape, it is possible to prevent air bubbles from being mixed and flowed into a central portion of a molded product obtained by integrating the resin base materials 155a and 155b with each other. Therefore, a quality of the molded product can be improved.

In addition to this, if the cavity 151 of the aging die 154 is set to be in a vacuum state in the aging process, it is possible to further prevent air bubbles from being mixed and flowed to the central portion of the joining faces of the resin base materials 155a and 155b in the aging process.

A method for setting the vacuum state of the cavity 151 can be used in the above Embodiments 12 to 15.

Embodiment 17

Each of FIGS. 32 to 37 is a view showing a manufacturing apparatus of a plastic mirror for executing a manufacturing method of the plastic mirror in accordance with another embodiment of the present invention.

This manufacturing apparatus is constructed as follows.

Figure 33:
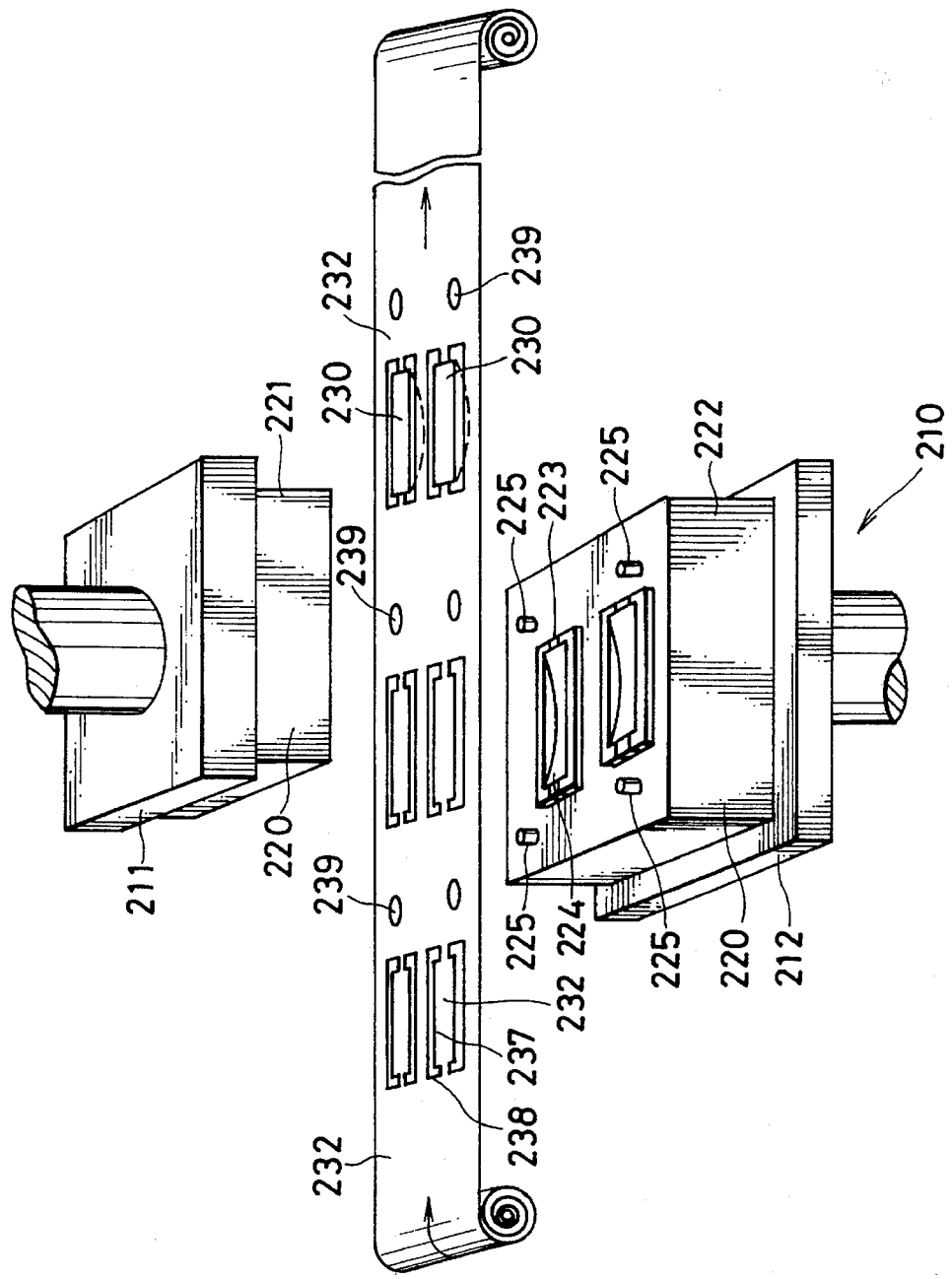
FIG. 33 is a perspective view showing the manufacturing apparatus in the embodiment of FIG. 32.
Figure 34:
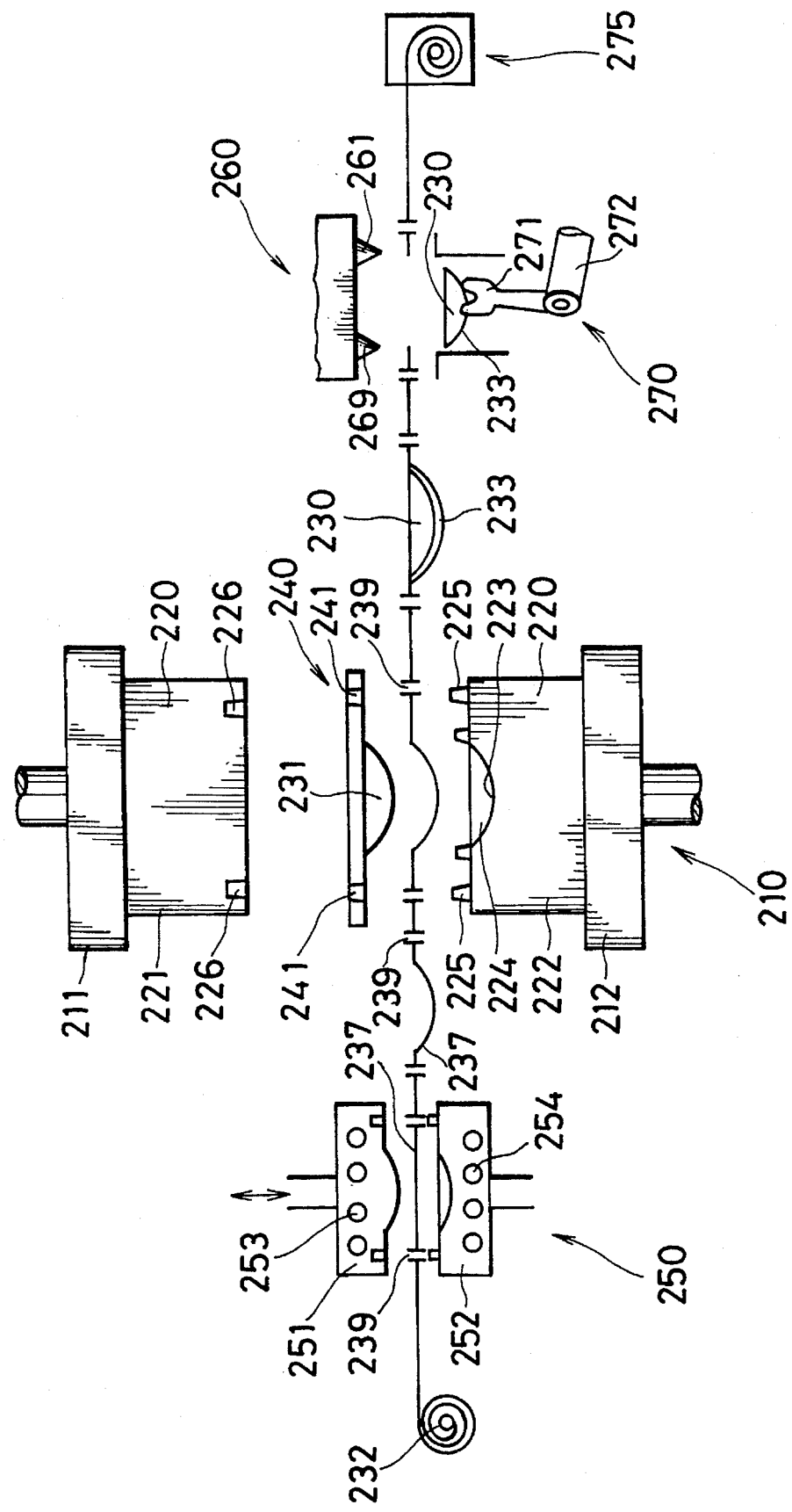
FIG. 34 is a side view showing an entire construction of the manufacturing apparatus in the embodiment of FIG. 32.

In FIGS. 32 to 37, a press machine 210 is constructed by an upper die 211 and a lower die 212 constituting a die pair. A predetermined pressure is applied between the upper and lower dies 211 and 212. A molding die 220 is constructed by an upper die 221 and a lower die 222 constituting a die pair. As shown in FIGS. 33 and 34, the upper die 221 and the lower die 222 respectively have positioning portions 226 and 225 for positioning these upper and lower dies. The upper die 221 and the lower die 222 are respectively fixed to opposite faces of the upper die 211 and the lower die 212. The molding die 220 definitely forms a plurality of cavities 224 forming mirror faces 223 by joining opposite faces of the upper die 221 and the lower die 222 with each other. The cavities 224 of this molding die 220 is communicated with an unillustrated vacuum device through an unillustrated passage so that air within the cavities 224 is sucked by this vacuum device to form a vacuum state of the cavities. This molding die 220 is clamped by the press machine 210 and a predetermined pressure is applied to the cavities 224. For example, the molding die 220 is vibrated, pressurized and opened. Namely, the press machine 210 constitutes means for clamping, opening and pressurizing the molding die 220.

For example, this press machine 210 has a heating medium such as a bar heater, a heating wire, etc. and also has a cooling medium as a refrigerant such as water, oil, etc. The press machine 210 further has a heating-cooling means 213 for heating and cooling the molding die 220 with a predetermined temperature gradient (see FIG. 32). The heating-cooling means 213 gradually heats and cools the molding die 220 in a predetermined temperature condition.

A plastic base material 231 is made of amorphous resin such as acrylic resin, polycarbonate resin, amorphous polyolefin resin, etc. The plastic base material 231 is simply called a base material in the following description. The base material 231 is approximately formed in a final shape equal to that of a space definitely formed by the cavity 224. This base material 231 is inserted into the cavity 224 of the molding die 220 by a base material supplying device 240 shown in FIG. 34.

This final shape of the base material 231 is suitably formed by injection molding to improve productivity. The base material 231 may be molded by using the molding die 220. However, a mirror face 223 of the molding die 220 is formed in a concave shape. Accordingly, it is preferable to separately prepare a base material molding die having a radius of curvature larger than that of the mirror face 223 such that a face of the base material 231 corresponding to the mirror face 223 is formed in a convex shape having a radius of curvature larger than that of the mirror face 223. In this case, melted amorphous resin is injected into a cavity of this base material molding die and is cooled to a temperature equal to or lower than a thermal deforming temperature of this amorphous resin, thereby forming the base material 231. This base material 231 is again melted and is gradually cooled within the molding die 220. Therefore, it is not necessary to gradually cool the base material 231 such that no distortion is caused in molding of the base material 231. Accordingly, the base material 231 can be rapidly formed. Further, when the base material 231 is injection-molded, the base material molding die is held at a temperature equal to or lower than the thermal deforming temperature of the injected amorphous resin so that an working time for forming the base material 231 is reduced. The base material 231 may be formed by mechanical processing using a lathe, etc.

A plastic film 232 is made of amorphous resin excellently joined with the base material 231. The plastic film 232 is simply called a film in the following description. For example, one face of the film 232 is covered with aluminum by electroless plating so that a metallic reflecting film 233 is formed. As shown in FIG. 33, this plastic film 232 has inserting portions 237 corresponding to the number of mirror faces 223 of the molding die 220 to transfer the mirror faces 223. The plastic film 232 also has a supporting portion 238 for supporting each of the inserting portions 237. The plastic film 232 further has an engaging portion 239 engaged with each of the positioning portions 225 of the molding die 220 to position an inserting portion 237 and a mirror face 223. The plastic film 232 can be continuously fed by a predetermined amount so as to insert the inserting portion 237 into the cavity 224.

Figure 35:
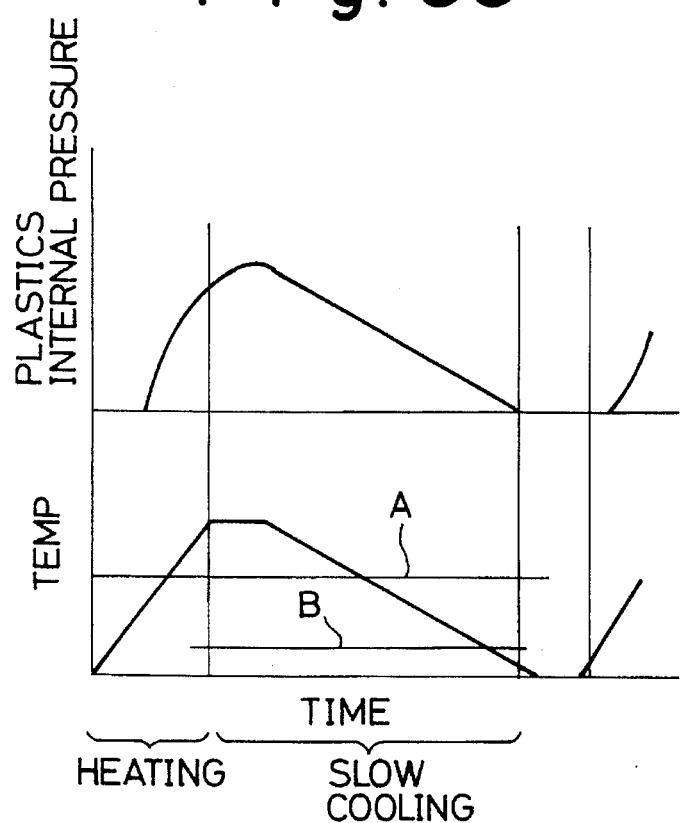
FIG. 35 is an explanatory view showing temperature and pressure within a cavity in the manufacturing apparatus in the embodiment of FIG. 32.
Figure 36:
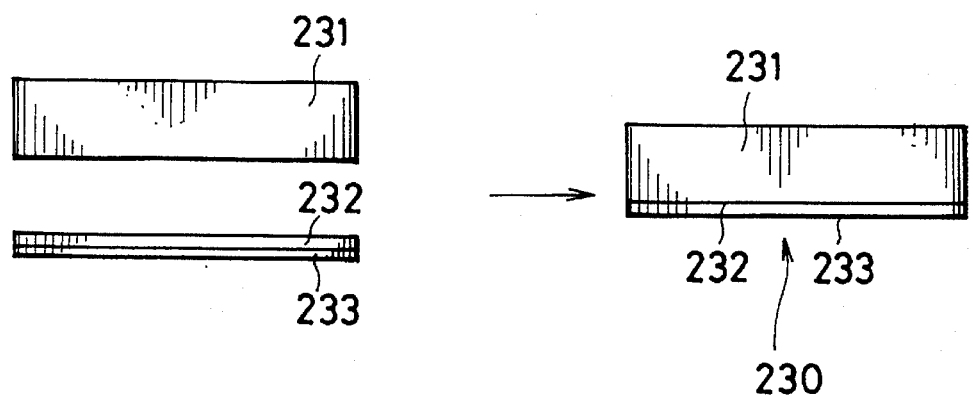
FIG. 36 is a side view showing a molded product molded in the embodiment of FIG. 32.
Figure 37:
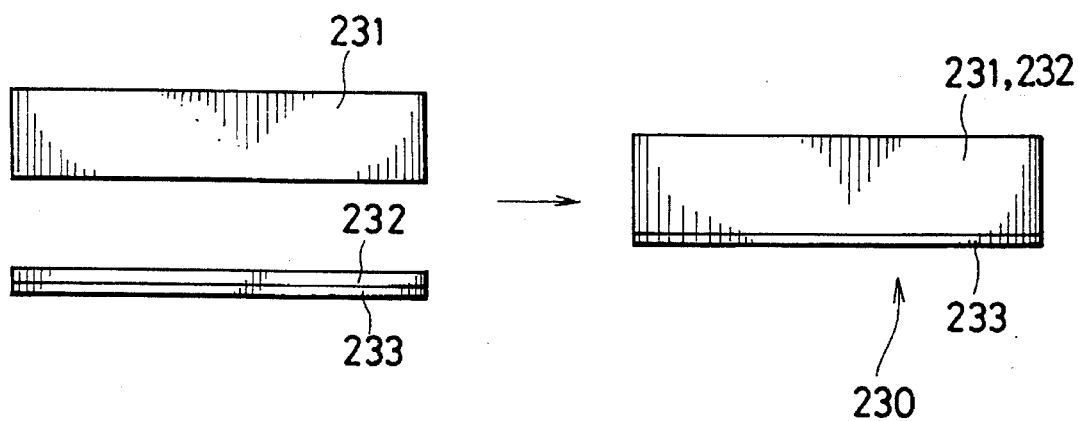
FIG. 37 is a side view showing another molded product molded in the embodiment of FIG. 32.

This plastic film 232 and the base material 231 are inserted into the molding die 220 such that the metallic reflecting film 233 of the inserting portion 237 of the plastic film 232 comes in contact with the mirror face 223 of the molding die 220 and the base material 231 is formed on a rear face side of the metallic reflecting film 233 of the inserting portion 237. This molding die 220 is then clamped by a die clamping-opening means of the press machine 210. Thus, as shown in FIG. 35, the heating-cooling means 213 heats and melts the plastic film and the base material at a temperature equal to or higher than a glass transition point. Otherwise, the heating-cooling means 213 heats the plastic film and the base material approximately to the glass transition point. Further, a pressuring means vibrates and pressurizes the molding die 220 so that an internal resin pressure is generated within the cavity 224. Thus, the mirror face 223 of the molding die 220 is transferred to the metallic reflecting film 233 of the inserting portion 237 so that a molded product 230 is formed as shown in FIG. 36. The inserting portion 237 of the plastic film 232 is heated to a deformable temperature thereof by a molding machine 250 shown in FIG. 34 to improve a transfer accuracy of the mirror face 223 of the molding die 220 with respect to the metallic reflecting film 233. The metallic reflecting film 233 is then approximately formed by press molding in advance in a shape equal to that of the mirror face 223 of the molding die 220.

The thermal deforming temperature of the plastic film 232 is preferably equal to or higher than a temperature of the base material 231. When the plastic film 232 is made of amorphous resin as the same material as the base material 231, the plastic film 232 can be preferably integrated with the base material 231 as shown in FIG. 36. The metallic reflecting film 233 may be formed on the plastic film 232 by sputtering and evaporation. However, it is advantageous to coat the metallic reflecting film 233 by electroless plating in consideration of manufacturing cost and mass production. It is necessary to set an area for this metallic reflecting film 233 to be equal to or smaller than that for the mirror face 223 of the molding die 220. In this case, the metallic reflecting film 233 is manufactured such that the area for the metallic reflecting film 233 is larger than that for the mirror face 223 of the molding die 220. Thereafter, the metallic reflecting film 233 is punched such that the metallic reflecting 233 has the same shape as the mirror face 223 of the molding die 220 and the area for the metallic reflecting film 233 is equal to or smaller than that for the mirror face 223 of the molding die 220.

In FIG. 34, the above base material supplying device 240 constitutes a means for the base material 231 to the molding die 220. The base material supplying device 240 has an engaging hole 241 engaged with a positioning portion 225 of the lower die 222 of the molding die 220. The base material supplying device 240 is aligned with the molding die 220 by engaging the engaging hole 241 with the positioning portion 225. The base material 231 is held by an unillustrated sucking means, etc. and is arranged on the inserting portion 237. Further, a means for heating the held base material 231 may be disposed in the base material supplying device 240.

The above molding machine 250 constitutes a means for molding the inserting portion 237 of the plastic film 232 in advance and is constructed by an upper die 251 and a lower die 252. Opposite faces of the upper die 251 and the lower die 252 are formed in a shape of the mirror face 223 of the molding die 220. The opposite face of the upper die 251 is formed in a convex shape and the opposite face of the lower die 252 is formed in a concave shape. This molding machine 250 has heating portions 253 and 254 for respectively holding the upper and lower dies 251 and 252 at a predetermined temperature. The inserting portion 237 is supported by the upper and lower dies 251 and 252 between the opposite faces thereof. The inserting portion 237 is heated to a deformable temperature thereof and is pressed at a predetermined pressure such that the opposite faces are joined with each other. Thus, the inserting portion 237 is pressed and molded without distortion.

A cutter 260 has a pair of edges 261. The cutter 260 constitutes a cutting means lowered to cut the supporting portion 238 of the plastic film 232, and cutting and separating the inserting portion 237 from the plastic film 232.

A molded product taking-out device 270 has a holding portion 271 for holding the metallic reflecting film 233 of a molded product 230 such that no metallic reflecting film 233 is damaged. The molded product taking-out device 270 also has a conveying portion 272 for conveying and discharging the molded product 230 to a predetermined position. The molded product taking-out device 270 constitutes a means for taking out the molded product.

A film supplying device 275 constitutes a means for supplying a plastic film to the molding die 220. A predetermined cutting amount of the plastic film 232 is wound around the film supplying device 275. In this case, the transfer or inserting portion 237 is cut on the basis of a signal of a controller. The inserting portion 237 of the plastic film 232 is conveyed by the film supplying device 275 to a position of the mirror face of the molding die 220.

This controller is constructed by a central processing unit (CPU), a memory, an input/output (I/O) circuit, etc. The controller controls operations of the press machine 210, the base material supplying device 240, the molding machine 250, the cutter 260, the molded product taking-out device 270 and the film supplying device 275 based on information of a temperature and a pressure within the cavity 224 of the molding die 220 and a position, etc. of the inserting portion 237 of the plastic film 232 detected by a group of unillustrated sensors in accordance with control programs stored to an internal memory of the controller in advance.

An operation of the manufacturing apparatus of a plastic mirror in this embodiment will next be described.

The film supplying device 275 first winds a predetermined amount of the plastic film 232 therearound and conveys the inserting portion 237 to a predetermined position between the upper and lower dies 251 and 252 of the molding machine 250. The molding machine 250 then heats the inserting portion 237 to a deformable temperature and presses and molds the inserting portion 237 such that the inserting portion 237 has a shape approximately similar to that of the mirror face 223 of the molding die 220.

Next, the molding die 220 is heated by the heating-cooling means 213 such that a temperature of the molding die 220 is equal to or lower than the thermal deforming temperature of the base material 231. In this heating state, the engaging portion 239 of the plastic film 232 is engaged with the positioning portion 225 of the molding die 220. Further, in the heating state, the inserting portion 237 is inserted into the molding die 220 such that the metallic reflecting film 233 of the inserting portion 237 comes in contact with the mirror face 223 of the molding die 220.

Next, the base material supplying device 240 is moved such that the positioning portion 225 of the molding die 220 is engaged with the engaging hole 241. The held base material 231 is conveyed and arranged on the inserting portion 237 by the base material supplying device 240. The base material 231 and the inserting portion 237 of the plastic film 232 are then inserted into the cavity 224 of the molding die 220. After the base material supplying device 240 inserts the base material 231 into the cavity 224, the base material supplying device 240 is returned to its original position.

The molding die 220 is next clamped by moving the upper and lower dies 211 and 212 of the press machine 210. At this time, die clamping force is set such that the molding die 220 bears an internal resin pressure at a melting time of the base material 231, and the molding die 220 and its mirror face 223 are not deformed.

Next, while the cavity 224 is vacuumed by the above vacuum device, the molding die 220 is heated and melted by the heating-cooling means 213 until a temperature equal to or higher than a glass transition point of the base material 231. Otherwise, the molding die 220 is approximately heated to the glass transition point. The base material 231 is vibrated and pressurized by the press machine 210 so that an internal resin pressure is generated as shown in FIG. 35. The mirror face 223 of the molding die 220 is then transferred to the metallic reflecting film 233 of the inserting portion 237 by the internal resin pressure within the cavity 224 of the molding die 220. Thus, the base material 231 and the inserting portion 237 are joined with each other.

The operation of the above vacuum device is stopped after the base material 231 is melted and the internal pressure of the cavity 224 reaches a predetermined pressure. Then, the molding die 220 is gradually cooled by the heating-cooling means 213 such that no irregular temperature and pressure are caused within the cavity 224, thereby molding a molded product 230. When the internal pressure of the cavity 224 is approximately equal to an atmospheric pressure and the temperature of the cavity 224 is equal to or lower than the thermal deforming temperature of the base material 231, the press machine 210 moves the upper and lower dies 211 and 212 upward and downward so that the molding die 220 is opened. A cooling speed of the molding die 220 depends on a size of the molding die 220, a shape of the cavity 224, a composition of the base material 231, etc. When the base material 231 is formed by using polycarbonate, the glass transition point is approximately equal to 145° C. and the thermal deforming temperature is approximately equal to 135° C. Accordingly, a heating temperature of the molding die 220 is suitably set to about 145° C. to 180° C.

The molded product 230 has the base material 231 and the inserting portion 237 joined with each other. This inserting portion 237 is provided by transferring the mirror face 223 of the molding die 220 to the metallic reflecting film 233. Such a molded product 230 is conveyed to a predetermined position below the cutter 260. The cutter 260 is lowered and cuts the supporting portion 238 of the plastic film 232 while the holding portion 271 of the molded product taking-out device 270 holds the metallic reflecting film 233 of the molded product 230 without damaging this metallic reflecting film 233. The molded product taking-out device 270 then discharges the molded product 230 to a predetermined position. The plastic film 232 cut in the inserting portion 237 is wound around the film supplying device 275.

As mentioned above, in this embodiment, faces of the base material 231 and the inserting portion 237 of the plastic film 232 corresponding to the mirror face 223 of the molding die 220 are approximately processed in a final shape having a radius of curvature larger than that of the mirror face 223. The base material 231 and the inserting portion 237 of the plastic film 232 having these faces are inserted into the molding die 220. The base material 231 comes in close contact with the mirror face 223 through the plastic film 232 and is melted. Thus, an internal resin pressure is generated within the cavity 224. The mirror face 223 of the molding die 220 is transferred by this internal resin pressure to the metallic reflecting film 233 of the inserting portion 237. Accordingly, the mirror face 223 of the molding die 220 can be transferred with high accuracy even when the metallic reflecting film 233 has an irregular thickness. Further, since the base material 231 and the plastic film 232 are constructed by using amorphous resin having a good transfer property, the mirror face 223 of the molding die 220 can be transferred with high accuracy. Accordingly, adhesive and joining properties of the plastic film 232 and the base material 231 can be improved. If the base material 231 and the plastic film 232 are constructed by the same material, the base material 231 and the plastic film 232 are integrated with each other so that influences of stress, temperature, humidity, etc. on the base material 231 and the plastic film 232 can be reduced.

After the internal resin pressure reaches a predetermined pressure, the molding die 220 is gradually cooled to a temperature equal to or lower than the thermal deforming temperature such that no irregular temperature and pressure are caused within the cavity 224. Accordingly, the base material 231 and the plastic film 232 can be joined with each other without causing distortion and stress. Accordingly, it is possible to prevent the plastic film 232 from being deformed.

Before the base material 231 and the inserting portion 237 of the plastic film 232 are inserted into the molding die 220, the inserting portion 237 is heated to a deformable temperature in advance. Further, the metallic reflecting film 233 is processed such that the metallic reflecting Film 233 has a shape approximately equal to that of the mirror face 223 of the molding die 220. Then, the base material 231 and the inserting portion 237 are inserted into the molding die 220. Accordingly, the inserting portion 237 is easily inserted into the molding die 220 so that it is possible to improve a transfer accuracy of the mirror face 223 of the molding die 220 transferred to the metallic reflecting film 233.

While the cavity 224 is vacuumed, the base material 231 is melted and an internal resin pressure is generated within the cavity 224. Accordingly, it is possible to prevent air, etc. from being flowed into a clearance between the plastic film 232 and the base material 231, and prevent the transfer accuracy of the mirror face 223 of the molding die 220 from being reduced.

The metallic reflecting film 233 is normally formed by evaporation or sputtering to provide a uniform thickness. However, in the present invention, the metallic reflecting film 233 can be formed by using electroless plating at low cost since the mirror face 223 of the molding die 220 can be transferred with high accuracy even when the metallic reflecting film 233 has an ununiform thickness.

The film supplying device 275 inserts the inserting portion 237 of the plastic film 232 into the cavity 224. The base material supplying device 240 also inserts the base material 231 into the cavity 224. The base material 231 and the inserting portion 237 are joined with each other so that a molded product 230 is molded. Thereafter, the cutter 260 cuts the supporting portion 238 of the plastic film 232. The molded product taking-out device 270 discharges the molded product 230 to a predetermined position without damaging the metallic reflecting film 233 thereof. Therefore, it is possible to continuously manufacture the molded product 230 having a mirror face with high accuracy without adding any manual operation. Accordingly, productivity of the molded product can be improved with stable quality.

The metallic reflecting film 233 is not formed on an entire face of the plastic film 232, but may be formed only in the inserting portion 237. Accordingly, the metallic reflecting film 233 can be formed in accordance with a mirror shape.

Embodiment 18

Figure 38:
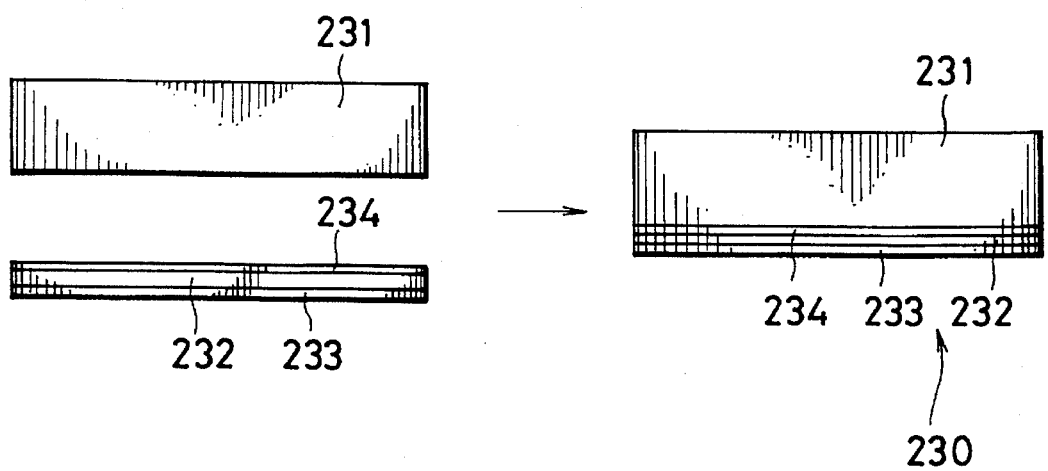
FIG. 38 is a side view showing a molded product molded by a manufacturing method of a plastic mirror in accordance with another embodiment of the present invention.

FIG. 38 is a view showing a manufacturing method of a plastic mirror in accordance with another embodiment of the present invention. In this embodiment, constructional portions similar to those in the Embodiment 17 are designated by the same reference numerals and an explanation thereof is omitted in the following description.

In FIG. 38, a plastic film 232 on a rear face side of a metallic reflecting film 233 is coated with an adhesive layer 234. The adhesive layer 234 adheres a base material 231 to the plastic film 232. This adhesive layer 234 is located between the base material 231 and the plastic film 232 and is inserted into a die 220. The adhesive layer 234 is heated to a temperature close to a glass transition point of the base material 231 so that the base material 231 and the plastic film 232 are joined with each other through the adhesive layer 234. The adhesive layer 234 is constructed by an adhesive of a thermal effect reaction type. In the case of this thermal effect reaction type, the adhesive layer 234 is heat-cured by heating this adhesive layer 234 to the temperature close to the glass transition point of the base material 231 so that the base material 231 and the plastic film 232 are adhered to each other. Otherwise, the adhesive layer 234 is constructed by an adhesive of a hot melting type. In the case of this hot melting type, the adhesive layer 234 is melted by heating this adhesive layer 234, and the base material 231 and the plastic film 232 are adhered to each other by cooling the adhesive layer 234.

In this embodiment, in addition to the effects in the above Embodiment 17, the base material 231 and the plastic film 232 are joined with each other through the adhesive layer 234 so that the plastic film 232 and the base material 231 can be constructed by using materials different from each other. Further, adhesive and joining properties of the plastic film 232 and the base material 231 can be further improved. Similar effects can be obtained even when an adhesive face of the base material 231 on a side of the plastic film 232 is coated with this adhesive layer 234.

Embodiment 19

FIG. 39 is a view showing a manufacturing method of a plastic mirror in accordance with another embodiment of the present invention. In this embodiment, constructional portions similar to those in the Embodiment 17 are designated by the same reference numerals and an explanation thereof is omitted in the following description.

In FIG. 39, for example, a base material 281 is constructed by an amorphous plastic composite material composed of a reinforced filler 285 made of glass fibers, carbon fibers, mica, etc. Strength and Young's modulus of the base material 281 are improved by using this composite material in comparison with the Embodiments 17 and 18. This base material 281 is approximately formed in a final shape.

A film 282 is formed by amorphous resin as a base of the base material 281 such that the film 282 has a thickness of 50 μm to 800 μm. One face of this film 282 is coated with a metallic reflecting film 283 to transfer the shape of a mirror face 223 of a die 220.

Figure 39A:
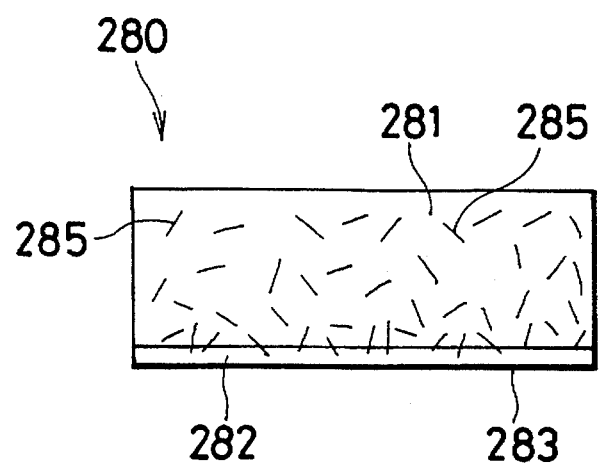
FIGS. 39a to 39c are side views each showing a molded product molded by a manufacturing method of a plastic mirror in accordance with another embodiment of the present invention.

The base material 281 and the film 282 are inserted into the die 220 and the mirror face 223 is transferred. As shown in FIG. 39*a*, it is possible to form a molded product 280 having a mirror face having improved strength and Young's modulus with high accuracy.

Figure 39B:
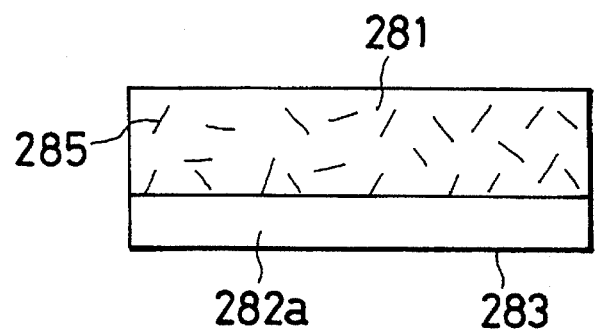
Figure 39C:
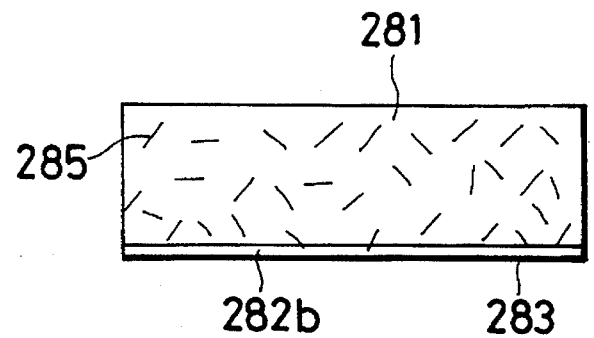

In this embodiment, the base material 281 is constructed by using the amorphous plastic composite material constituting the reinforced filler 285. Accordingly, in addition to the effects in the Embodiments 17 and 18, it is possible to prevent the base material 281 from being deformed by stress caused by a difference in expansion coefficient between the base material 281 and an attached housing, etc. Accordingly, it is also possible to prevent the shape of the mirror face of the metallic reflecting film 283 from being deformed. The film 282 has a thickness of 50 μm to 800 μm. When a film 282*b* having a thickness less than 50 μm is used as shown in FIG. 39*c*, the metallic reflecting film 283 is deformed with wrinkles, etc. by mechanical stress and thermal stress at a heating time of the die 220 when the metallic reflecting film 283 is inserted into the die 220. Further, the reinforced filler 285 of the base material 281 is exposed to a portion near the metallic reflecting film 283 so that the shape of the mirror face of the metallic reflecting film 283 is influenced by this exposed filler 285. However, in the present invention, such disadvantages can be prevented. In contrast to this, when a film 282*a* having a thickness greater than 800 μm is used as shown in FIG. 39*b*, no shape of the film 282*a* is easily changed so that the metallic reflecting film 283 is deformed with wrinkles and is cracked when the mirror face 223 of the die 220 is transferred. Further, the metallic reflecting film 283 is distorted by stress caused by a difference in thermal shrinkage factor between the metallic reflecting film 283 and the base material 281 so that transfer accuracy of the mirror face 223 is reduced. However, such disadvantages can be prevented in the present invention.

Embodiment 20

Figure 40:
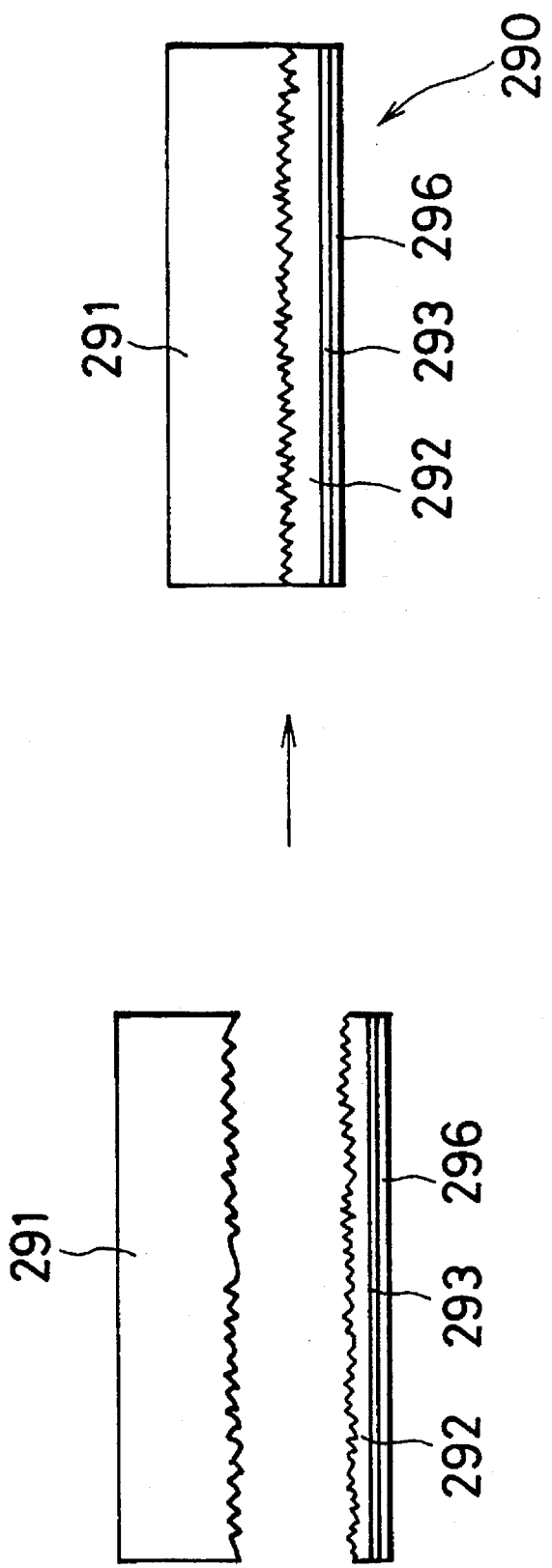
FIG. 40 is a side view showing a molded product molded by a manufacturing method of a plastic mirror in accordance with another embodiment of the present invention.
Figure 41:
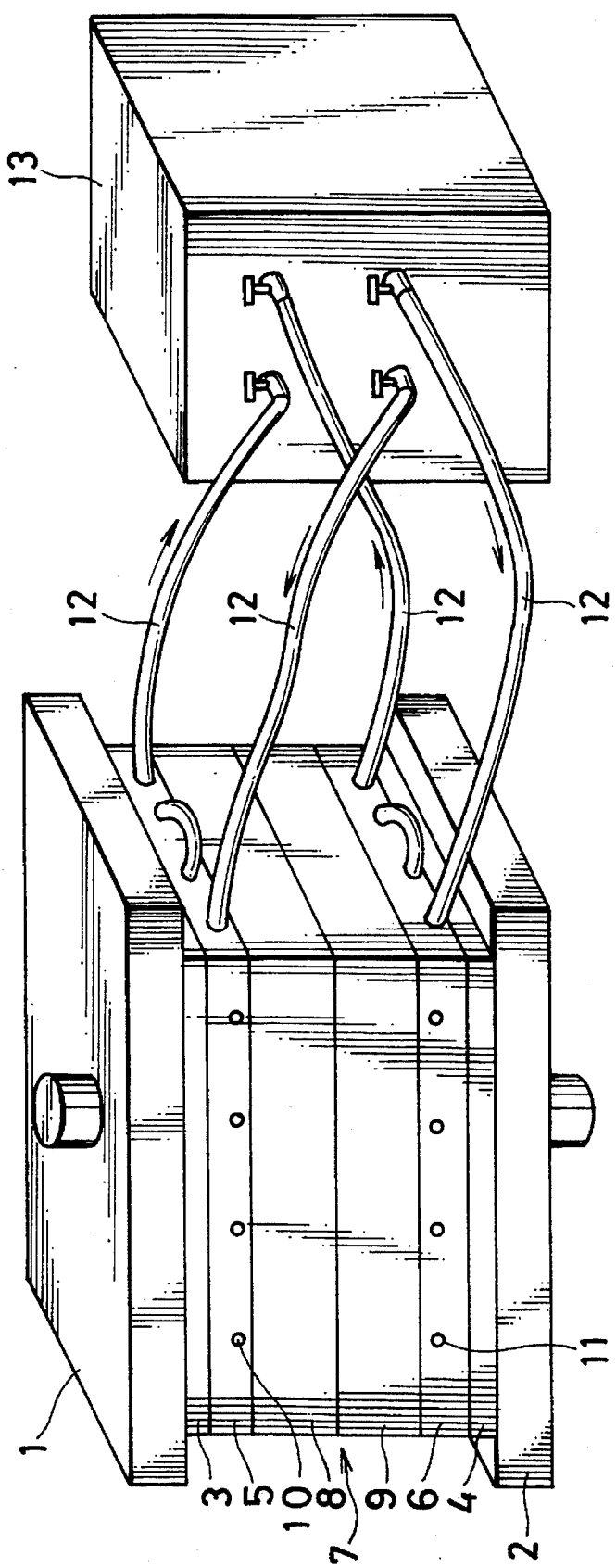
FIG. 41 is a perspective view of a cooling device for cooling a general die for plastic molding.

FIG. 40 is a view showing a manufacturing method of a plastic mirror in accordance with another embodiment of the present invention. In this embodiment, constructional portions similar to those in the Embodiment 17 are designated by the same reference numerals and an explanation thereof is omitted in the following description.

In FIG. 40, a base material 291 is made of amorphous resin and a film 292 is made of amorphous resin preferably joined with the base material 291. Contact surfaces of the base material 291 and the film 292 are physically or chemically processed such that each of these contact surfaces has a predetermined surface roughness. A metallic reflecting film 293 is formed on one face of the film 292. For example, the metallic reflecting film 293 is protected by a protecting film 296 made of $SiO_2$. The base material 291 and the film 292 are joined with each other so that a molded product 290 is formed.

In this embodiment, in addition to the effects in the Embodiments 17 to 19, adhesive and joining properties of the base material 291 and the film 292 can be further improved since each of the contact surfaces of the base material 291 and the film 292 has a predetermined surface roughness. Further, since the protecting film 296 is formed on a surface of the metallic reflecting film 293, it is possible to prevent the metallic reflecting film 293 from being mechanically deteriorated with the passage of time. In this embodiment, each of the contact surfaces of the base material 291 and the film 292 has a predetermined surface roughness, but one of the contact surfaces may be set to have a predetermined surface roughness.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for manufacturing a molded product of resin, comprising a blank molding process and an aging process separated from each other;

said blank molding process including the step of:
preprocessing a plastic base material approximately in a final shape in advance by injection molding, said aging process including the steps of:
inserting said preprocessed plastic base material and a plastic film having a metallic reflecting film into a cavity of an aging die having a plurality of cavities and having at least one mirror face for each of said cavities, in such a manner that the metallic reflecting film of the plastic film comes in contact with the mirror face in the cavity and the plastic base material is located on a rear face side of the plastic film opposite to the metallic reflecting film;

heating the aging die to a temperature equal to or higher than the glass transition temperature of the plastic material and keeping the cavity of the aging die under a vacuum to eliminate air bubbles during the heating;

holding the aging die for a predetermined time at the temperature equal to or higher than the glass transition temperature so that an internal resin pressure is generated within the cavity by expansion of the plastic material, thereby to form an integral molded product by melting and joining the plastic base material and the plastic film with each other; and gradually cooling the aging die to a temperature equal to or lower than a thermal deforming temperature of the plastic material by a cooling means having a plurality of heat pipes arranged in a die plate of a press machine, said die plate being of high thermal conductivity material, and transferring the mirror face to the metallic reflecting film of the plastic film.

2. A method for manufacturing a molded product of resin as claimed in claim 1, wherein said plastic base material is constructed by using an amorphous resin.

3. A method for manufacturing a molded product of resin as claimed in claim 1, wherein the plastic base material and the plastic film are constructed of the same material.

4. A method for manufacturing a molded product of resin as claimed in claim 1, wherein a face of said plastic base material coming in contact with the plastic film has a radius of curvature smaller than that of the mirror face when the mirror face in said cavity is formed in a convex shape; and the face of said plastic base material coming in contact with the plastic film has a radius of curvature larger than that of the mirror face when the mirror face in said cavity is formed in a concave shape.

5. A method for manufacturing a molded product of resin as claimed in claim 1, wherein the plastic film having the metallic reflecting film includes:

an inserting portion inserted onto the mirror face in said cavity;

an engaging portion formed in the vicinity of the inserting portion and engaged with a positioning portion formed on the aging die when the inserting portion is located on the mirror face; and a supporting portion for supporting the inserting portion;

the inserting portion, the engaging portion and the supporting portion are continuously formed in a feeding direction of the plastic film;

the plastic film is fed out by a film supplying device and is inserted into the cavity such that the metallic reflecting film in the inserting portion comes in contact with said mirror face;

the plastic base material is inserted into the cavity by a base material supplying device such that the plastic base material is located on the rear face side of the plastic film in the inserting portion;

the dies are next clamped; and the inserting portion is continuously cut from the supporting portion in accordance with a feeding amount of the plastic film before or after the plastic base material is melted.

6. A method for manufacturing a molded product of resin as claimed in claim 1, wherein said plastic film has a thickness of 50 μm to 800 μm.

* * * * *